US005753736A

United States Patent [19]
Bhat et al.

[11] Patent Number: 5,753,736
[45] Date of Patent: May 19, 1998

[54] DIMENSIONALLY STABLE FIBERS AND NON-WOVEN WEBS

[75] Inventors: Gajanan S. Bhat; Vasanthakumar Narayanan; Larry C. Wadsworth, all of Knoxville, Tenn.

[73] Assignee: The University of Tennessee Research Corporation, Knoxville, Tenn.

[21] Appl. No.: 739,733

[22] Filed: Nov. 7, 1996

Related U.S. Application Data

[63] Continuation of Ser. No. 392,064, Feb. 22, 1995, abandoned.
[51] Int. Cl.$^6$ .............. C08K 5/09; B32B 27/36; D02G 3/00
[52] U.S. Cl. .......... 524/287; 524/292; 428/224; 428/272; 428/372; 428/902; 528/308.1; 528/308.2; 264/211.14
[58] Field of Search ............... 524/287, 292; 428/224, 272, 372, 902; 528/308.1, 308.2; 264/211.14

[56] References Cited

U.S. PATENT DOCUMENTS

| H1502 | 11/1995 | Allan et al. | 428/224 |
|---|---|---|---|
| 3,533,994 | 10/1970 | Stewart et al. | 260/31.2 |
| 4,070,432 | 1/1978 | Tamaddon | 264/210 F |
| 4,336,343 | 6/1982 | Aharoni | 524/297 |
| 4,351,757 | 9/1982 | Hoeschele | 524/296 |
| 4,401,792 | 8/1983 | Axelrod et al. | 525/175 |
| 4,536,531 | 8/1985 | Ogawa et al. | 524/135 |
| 4,948,823 | 8/1990 | Wallach | 524/504 |
| 5,108,827 | 4/1992 | Gessner | 428/297 |
| 5,294,482 | 3/1994 | Gessner | 428/287 |
| 5,336,709 | 8/1994 | Antikow et al. | 524/493 |

OTHER PUBLICATIONS

Fairley, G. and Prud'homme, R.E., "A Contribution to the Understanding of Polyethylene/Ionomer/Polyamide–6 Blends", Polymer Engineering and Science, vol. 27, No. 20, pp. 1495–1503 (1987).

Gupta, R. K. and Auyeung, K. F., "Crystallization in Polymer Melt Spinning", Journal of Applied Polymer Science, vol. 34, 2469–2484 (1987).

Legras, R. and Mercier, J. P., "Polymer Crystallization by Chemical Nucleation", Letters to Nature, 304:432–434 (1983).

Legras, R., et al., "Chemical Nucleation, a New Concept Applied to the Mechanism of Action of Organic Acid Salts on the Crystallization of Polyethylene Terephthalate and Bisphenol–A Polycarbonate", Polymer, 25:835–844 (1984).

Lu, F.M. and Spruiell, J. E., "The Role of Crystallization Kinetics in the Development of the Structure and Properties of Polypropylene Filaments", Journal of Applied Science, 49:623–631 (1993).

Mehta, S. and Deopura, B. L., "Fibers from Blends of PET and Thermotropic Liquid Crystalline Polymer", Polymer Engineering and Science, vol. 33, No. 14, pp. 931–936 (1993).

Mercier, J.P., "Nucleation in Polymer Crystallization: A Physical or Chemical Mechanism?", Polymer Engineering and Science, vol. 30, No. 5, pp. 270–278 (1990).

Turturro, G., Brown, G. R., and St-Pierre, L. E., "Effect of Silica Nucleants on the Rates of Crystallization of Poly(ethylene terephthalate)", Polymer, 25:659–653 (1984).

Williams, David J., "Applications for Thermotropic Liquid Crystal Polymer Blends", Advances in Polymer Technology, vol. 10, No. 3, 173–184 (1990).

Wittmann, J. C., Hodge, A. M., and Lotz, B., "Epitaxial Crystallization of Polymers onto Benzoic Acid: Polyethylene and Paraffins, Aliphatic Polyesters, and Polyamides", Journal of Polymer Science: Polymer Physics Edition, vol. 21, 2495–2509 (1983).

Primary Examiner—Vasu Jagannathan
Assistant Examiner—Olga Asinovsky
Attorney, Agent, or Firm—Weiser & Associates, P.C.

[57] ABSTRACT

Dimensionally stable (shrink-resistant) polyester fibers, webs and fabrics, comprising a nucleating agent incorporated into the fibers are disclosed. Methods of incorporating the nucleating agent within the polyester are disclosed.

38 Claims, 27 Drawing Sheets

DIMENSIONALLY STABLE FIBERS AND NON-WOVEN WEBS

This application is a continuation of application Ser. No. 08/392,064 filed Feb. 22, 1995 now abandoned.

BACKGROUND OF THE INVENTION

Poly(ethylene terephthalate), PET is one of the main polymers used in the commercial production of fibers, films, bottles and injection molded goods. Although PET has higher melting point and superior mechanical and physical properties compared to other commercially used polymers like poly(propylene), poly(ethylene), poly(amide), poly (butylene terephthalate) etc., it exhibits poor dimensional stability at temperatures above the glass transition (70°–80° C.). PET fibers, and the products made from the fibers such as films and fabrics, may shrink up to 40% of the original length when subjected to these high temperatures. This shrinkage is due to the tendency of oriented amorphous molecules to relax on exposure to heat.

At commercial production rates, the polymer has little opportunity to form well developed crystallites. The slower crystallization rate of PET, as well as its homologues, such as poly(propylene), poly(ethylene), poly(amide), poly (butylene terephthalate) and poly(isopropyl terephthalate), and co-polymers, is described to its rigid aromatic structure compared to the more flexible aliphatic structures found in other commercial polymers. Thus articles made of PET usually have to go through an additional stage of drawing and heat-setting during the fiber spinning process to dimensionally stabilize the structure thus produced.

In conventional melt spinning, there is a high degree of control over individual filaments. The filaments formed are pulled downwards and wound on a take-up device that exerts some stress on the filaments. PET is very sensitive to stress-induced crystallization. But this effect is only seen when there is sufficient stress present during the processing such as that encountered in high speed spinning (take-up velocities of 5000–8000 m/min.). The critical stress required to induce crystallization on-line without any type of additives was shown to be 0.08 g/denier. In high speed spinning, winding of the filaments is a problem along with frequent yarn breaks and mechanical limitations. It would be ideal if one can produce the similar structures at low spinning speeds. It is generally proposed that the effect of on-line stress overrides that of the nucleating agents. This is the main reason for ignoring the use of nucleating additives in fibers or films.

In the spun bond process, the filament speeds tend to be much slower (1000–3000 m/min.) regardless of whether air drag or positive take-up roller drafting devices are utilized. The fiber drawing is accomplished through an aerodynamic device. There is lower stress and less degree of control over individual filaments compared to that in melt spinning. Spun bond fabrics are widely used as filter or pre-filter materials for hot liquid or gas, in textile garments as interlinings and in roofing applications. The fabrics/filters may be subjected to temperatures above 80° C. in these applications. The shrinkage of these materials can be prevented by having a dimensionally stable web.

In melt blowing, there is virtually no control over individual filaments because of the high degree of turbulence experienced by the fibers down stream during the process. Although the polymer melt is attenuated into very fine fibers, this is done when the polymer is still in a molten state (due to the action of high velocity hot air). Thus the stress developed during the process is very low eliminating the possibility of on-line crystallization. Incorporation of artificial nucleating sites would produce dimensionally stable webs. Melt blown webs are widely used as filters for hot liquid, gases and dust particles apart from face masks and interlinings. A melt blown web must have a larger surface area (smaller diameter fibers), moderate strength, flexibility and good textile hand. Drawing and heat-setting a melt blown or spun bond web is not possible without drastically altering the above mentioned characteristics. The main criteria for melt blown filters include finer fibers for improved filtration efficiency with minimal shrinkage (less than 5%) at elevated temperatures. The shrinkage was shown to be much below this level for PET fibers nucleated and reinforced with sodium benzoate and liquid crystalline polyester and a combination of both. The additives could be mixed at 0.1 to 3%. Fabric strength is not a main criterion for filters although a moderate strength to keep the webs coherent is desired. The success of producing dimensionally stable PET filters/fabrics lies in situations where the material has to be in contact with hot liquids or gases for prolonged period of time.

Melt blowing is a one step process to produce fabrics from thermoplastic polymers. A schematic depicting the melt blowing process is shown in FIG. 1. The plastic to be melt blown is fed to the extruder in the form of pellets, flakes or powder. The molten polymer is forced out of a die containing several spinneret holes. As soon as the molten polymer exits the die, a stream of high velocity, hot air attenuates the polymer into very fine fibers. The turbulence in the downstream helps in entangling the fibers to produce a coherent nonwoven web which is wound on a drum [1, 2]. Almost all thermoplastic polymers could be blown into a nonwoven web [3]. In principle, any fiber forming polymer of low melt viscosity can be processed on a melt blowing equipment. The most widely used polymer in melt blowing is the high melt flow rate poly(propylene). Poly(esters), nylons, poly (ethylenes) and poly(styrenes) have also been successfully processed [4, 5]. Meltblown webs have fine fibers with diameters in the range of 2–10 micrometers. This results in high surface area per unit volume of the web. The main application of melt blown webs is in the area of filtration, absorption and insulation.

The important variables in melt blowing are polymer throughput rate, melt temperature, die temperature, air temperature, air flow rate, screw speed and die-to-collector distance [6]. Melt blowing is a complex process that involves turbulence which is poorly understood by the scientists until today. Isolation of experimental factors is difficult because of interaction between different variables. The multifilament environment, and the environmental factors such as the humidity of the processing room, quench air temperature widely change the boundary conditions.

The process-structure-property relationships in melt blowing different molecular weight polypropylene resins (35–1000 MFR) were studied by Malkan et al. [6,7]. Polymer throughput rate had a noticeable effect on the physical characteristics of the melt blown webs. The mean fiber diameter, tensile strength, initial modulus, porosity, stiffness and web density increased with an increase in throughput rate. However, the breaking strain and the energy required to break decreased indicating the brittle nature of the webs produced at higher throughput rates. The increase in fiber diameter was attributed to die swell and the change in polymer-to-air ratio for a given air flow rate. The increase in air flow rate did not result in any significant change in mean fiber diameter. The die orifice size had only minimal effects on the average fiber diameter. Birefringence values ranged from $15.2 \times 10^{-3}$ for high throughput rates to $26.1 \times 10^{-3}$ for low throughput rates. The molecular weight and polydispersity index were found to decrease after processing the resins into webs. However, an increase in throughput rate did not result in any significant change in molecular weight of resins. The effects of throughput rate, air flow rate, and hole diameter on the percent crystallinity was observed to be insignificant. The webs produced at high throughput rate showed double melting peaks indicative of two different melting species. X-ray studies confirmed these results revealing the presence of α-form (monoclinic) and β-form (hexagonal) of crystals.

Using a single hole die, the effect of polymer throughput, air velocity, polymer and air temperatures on web properties were studied by Haynes et al. [8]. It was observed that the fiber was always continuous without any breakage in its flight and experienced flapping motion depending on the air velocity. An increase in air flow rate was found to decrease the mean fiber diameter for a fixed throughput rate and die geometry. A critical air velocity was observed, above which any increase in air flow rate had only little effect on the fiber diameter. Fiber diameter was also found to decrease on increasing the processing temperature.

Feasibility of melt blowing virgin and recycled PET has also been demonstrated [9, 10]. The shrinkage of PET webs was dependent on the air flow rate used. PET webs produced at high air flow rates shrank much more than those produced at low air flow rates because of the higher level of molecular orientation. Heat setting of melt blown PET webs or alternatively the use of PBT were suggested as the possible means of producing thermally stable melt blown polyester nonwovens [11, 12]. The effects of annealing on the web structure and the mode of failure of melt blown polyester webs were studied using SEM [13]. It was concluded that the greater extension of as-blown PET webs was due to their poor crystallization. Annealing resulted in brittle webs. The thermal effects on melt blown PET/PBT nonwovens was studied by that et al [14]. It was observed that the PET fibers tend to shrink on exposing to heat whereas that of PBT showed negligible shrinkage. Addition of up to 20 weight percent PET to PBT resulted in only a slight change in the shrinkage behavior.

The properties of semicrystalline polymers are highly dependent on the crystallization conditions and crystallization mechanisms [15]. The ability of a polymer to crystallize is dependent on the chemical repeat unit, molecular weight and stereoregularity. Under suitable conditions of temperature and stress, molecular ordering takes place in all three directions in macromolecular systems. Thermodynamic and kinetic criteria should be met for polymer crystallization to take place. Thremodynamics provides information only about the initial and final states of the material under investigation. Since the crystallization process involves time, the way the molecular segments participate to form an ordered crystal structure is better explained by the relatively recent kinetic theories. A concise review of the polymer crystallization theories was provided by Armstead et al [16]. Under quiescent conditions, polymers generally form chain folded crystals when grown from solution or melt as shown in FIG. 2. The chain folded configuration is due to minimization of Gibbs free energy. This way the crystallization is very rapid [17]. Polymer crystals tend to form thin lamellae which are large in two dimensions but are bound in the third dimension by the folds that form the basal plane. Although, Frank [18] and Hoffman [19] suggested the non-adjacent reentry model (Switch board type) to accommodate the cilia and loops, and associated density changes, neutron scattering studies [20, 21] show that the adjacent reentry is the predominant mode of crystallization in polymers.

The crystallization behavior of polymers is highly dependent on the chemical structure and intermolecular forces. Polymers with simple and linear structures such as polyethylene and polypropylene have faster crystallization kinetics compared to PET that has a rigid backbone structure. The chain straightening and folding is a lot easier in the case of linear structures that form regular crystals. Chain folding is difficult in the case of PET which has rigid ring structures in the main chain. This limits the ability of the polymer to crystallize to the fullest potential during processing. Most of the polymer processing operations involve the stretching of the molecular segments to bring them to crystal register. A detailed account of the stress during crystallization will be provided in section 3.5. Although, PET has polar carbonyl groups, the polarity is not that strong as in the case of nylons for crystallization. Polymer crystallization is highly rate dependent. PET can be made crystalline by slow cooling or completely amorphous by rapid quenching. Isothermal processing, although produces a crystalline material with better mechanical and thermal properties, is rarely encountered in actual polymer processing. Thus polymer processing operations are non-isothermal situations that involve a large thermal gradient which is difficult to follow with any available experimental technique.

The overall crystallization rate of a polymer is usually divided into nucleation and growth rates. Both isothermal and non isothermal kinetics could be studied using Differential Scanning Calorimetry (DSC). Other techniques to study the crystallization kinetics of polymers include light scattering, optical microscopy and infrared spectroscopy. The bulk crystallization rate as determined by DSC is influenced by overall nucleation density, the rate of nucleation on the crystal surface and the rate of transportation of the molecules to the growth front.

PET fibers which are molten at 300° C. and quenched to room temperature show virtually no presence of crystallinity even after a year, which is indicative of the poor crystallizibility of PET polymer. In PET films which were isothermally crystallized between 120° and 240° C., the half-time of crystallization (time required for 50% crystallinity to develop) showed a minimum (maximum rate of crystallization) near 190° C.

Jabarin [28] investigated the nature of PET crystallization by using a combination of characterization techniques such as Differential scanning calorimetry (DSC), Density gradient column (DGC), Small angle light scattering (SALS) and Depolarized light intensity (DLI). PET films of intrinsic viscosity 0.81 were isothermally crystallized at 110°, 115°, 125° and 130° C. for various periods of time. For the same treatment time, the higher the crystallization temperature, the more was the volume degree of material crystallized and vice versa. To achieve the same degree of crystallinity as at 130° C., the treatment time had to be almost four times at 115° C.

There has been very little report on the crystallization kinetics of PET due to the fact that a slight change in the structure due to the different catalyst systems used alters the kinetics appreciably. Hence consistent results are not obtained while conducting kinetic experiments. The isothermal and non-isothermal kinetics of PET were performed by Jabarin [29–31]. The chemical factors that affect kinetics include molecular structure, catalyst system, molecular weight and side reactions during polycondensation of PET.

The molecular weight affects viscosity and thus the rate of transportation of chain segments across the liquid-crystal interface. The physical factors that are important are the temperature, previous thermal history, nucleating additives, strain, orientation and pressure. It was concluded that the crystallization rate and mechanism of crystallization were dependent on the molecular weights, temperature and catalyst system. Of these, the catalyst system exhibited greater influence on the rate of crystallization. Among the catalyst systems investigated, titanium-based catalysts exhibited the lowest crystallization rate. The half-time of crystallization is not a true measure of crystallization as the exponent changes when crystallization proceeds. Isothermal crystallization mechanisms are easier to analyze theoretically than the dynamic non-isothermal crystallization mechanisms.

PET was extruded with several metal hydroxides [35] to study the effectiveness of nucleating additives in improving the crystallizibility of PET. An efficient nucleating additive would increase the maximum crystallization temperature $(T_{cc})$ on cooling from the melt and decrease the cold crystallization temperature $(T_{ch})$ on heating from the glassy state. Additives were compounded at temperatures above the $T_m$ of the polymer. Thermal analysis was carried out using DSC. It was found that the metal hydroxides, such as aluminum hydroxide $[Al(OH)_3]$, which released water over a narrow temperature interval spanning the processing temperature range of PET (260°–280° C.) were effective nucleants.

The effect of silica nucleants on the crystallization rate of PET was studied by Turturro et al. [36]. The maximum temperature of crystallization $(T_{cc})$ was found to increase with low loadings of silica (2 parts silica in 100 parts of PET). The trend was reversed and $T_{cc}$ decreased rapidly on increasing the concentration of silica particles. Thus the overall crystallization rate decreased at higher loading.

The influence of different catalyst systems and the molecular weight on the kinetics of crystallization of PET was studied by Gumther et al [37]. Two different catalyst systems, one with antimony trioxide and calcium acetate and the other with antimony trioxide with manganese acetate were used to produce PET of different molecular weights. The molar mass increased with manganese acetate thus slowing down the crystallization rate. The half-times of crystallization was smaller in the case of PET with calcium acetate catalyst systems.

Sodium salts of benzoic acid were tried successfully as nucleating agents for PET [38]. Sodium orthochlorobenzoate (SOCB) was used as a crystallization promoter. The nucleating efficiency of SOCB was found to be dependent on mixing temperature and time. Microscopic observations indicated that SOCB does not act like a classical heterogeneous nucleating additive. They rather dissolve and chemically react with PET molecules as true chemical reagents to form nucleating species.

Apart from organic and inorganic nucleating agents, polymeric additives were also tried for their ability to nucleate any other polymer. A liquid crystalline polyester (LCP—60 mole % PHB and 40 mole % PET) was solution blended and also melt mixed with PET at different ratios [40]. It was observed that the crystallinity was well developed in the solution cast films. As the amount of LCP was increased, the melting point remained unchanged but the heat of fusion decreased with increase in LCP content. The distinct exothermic peak of amorphous polymer was also missing in the case of solution cast PET. In the case of melt crystallized PET, the heating experiments showed that the $T_g$ remained unchanged while the $T_m$ and $T_{ch}$ decreased on increasing the LCP content from 0 to 70%. The 'window of crystallization' decreased and the width of the crystallization exotherm narrowed. These results indicate that in fact the LCP acted like a nucleating agent for PET.

At high concentration levels of LCP (30% and above), the LCP component does not really act like a modifier but rather gets diluted by PET. Much lower concentrations (less than 10 weight percent) of LCP (60/40 PHB/PET) were used by Bhattacharya et al. [41]. Crystallization rate of PET with LCP was observed to be much higher than that of pure PET.

Linear low Density Polyethylene (LLDPE) and Polypropylene act as efficient nucleating agents for PET [43]. Low molecular weight polypropylene (LMWPP) was tried as a nucleating agent for PET [43]. Inherent transitions, the Tg and Tm were unaffected by the presence of these additives but the cold crystallization exotherm appeared at a much lower temperature for nucleated resins.

The crystallization kinetics of PET blended with naturally functionalized triglyceride oil was studied by Barrett et al [44]. The unsaturated ester group in the castor oil and Vernonia oil was used to chemically react with PET to form interpenetrating networks (IPNs). The crystallization rate of PET was improved when cooling from the melt and also when heating from the glassy state. Synergistic effects were obtained by adding sodium benzoate.

When a polymer melt, such as PET, is strained, linear primary nuclei are formed, reducing the entropy between the chains in the crystalline and amorphous phases [46]. The crystallization proceeds at a much faster rate compared to that in the unstrained melt. Thus under identical conditions of spinning, straining results in an increase in the nucleation and growth rates due to increased supercooling effect. The resulting morphology is also totally different. In fiber spinning, increasing the take-up speed above 3000 m/min. results in shish-kebab structures. The shish consists of extended linear polymer segments in the form of a bundle. The overgrowth kebab is assumed to be made of folded chain lamellae grown at right angles to the fiber axis in the form of a cylindrite thus making the structure highly anisotropic. The high strength and modulus of fibers spun at speeds above 3000 m/min. are the result of the above mentioned morphological feature. Drawing results in the transformation of spherulites into microfibrils. In fiber spinning, one observes a purely jet flow with a significant longitudinal gradient. Within the die of reducing cross-section, the material experiences both transverse and longitudinal velocity gradients. Once the material exits the die, the longitudinal velocity gradient takes over till the material solidifies. Thus at slow spinning speeds, the fiber has a predominantly spherulitic structure that transforms into shish-kebab structure at high take-up speeds [46].

Strain induced crystallization (SIC), usually, does not occur in polymers when stretched from the glassy state because of the lack of molecular mobility. But polymers like PET and polycarbonate, show improvement in atomic packing on stretching. The molecular orientation is much higher in the glassy state because of limited relaxation. Thus there are distinct differences between SIC in melt and in glass. SIC nuclei were found to have limited dimensions along the stretch direction (100°–250 A°).

Spruiell et al. [50] has investigated the process of strain induced crystallization and crystallization during annealing treatments of deformed bulk PET films. The effects of deformation below and above $T_g$ on crystallization were studied. Straining the polymer below $T_g$ resulted in a neck formation and an increase in strain rate resulted in a corresponding increase in crystallinity. Samples strained and then annealed at 80°–105° C. at short times exhibited lower percent crystallinity than before annealing suggestive of crystallite melting and stress relaxation. The orientation of samples strained below $T_g$ and then annealed were retained.

PET has two macromolecular conformations, trans or extended chain conformation that exists in the crystalline phase, and gauche or coiled conformation that exists in the amorphous phase. It is the fraction, distribution and packing of these conformations that affect the crystallinity and associated mechanical and thermal properties of PET films. Crystallite length was found to increase with increase in stretch ratio.

A study on the superstructure of amorphous PET films drawn above and below $T_g$ using light scattering and optical microscopy was performed by Misra et al [52]. Cold drawing of PET produced a necked region with high amount of orientation and crystallinity and an unnecked region with little or no orientation and crystallinity. Thus cold drawing PET resulted in the formation of rod-like superstructures surrounded by imperfect extended chain crystals. Stretching PET above Tg provided information about that formed due to strain induced crystallization only since the thermal crystallization was negligible. At low elongations, a rod-like structure existed that did not contribute to crystallinity but was oriented in a direction perpendicular to stretching. At high elongations the rods changed into ellipsoidal spherulites that are elongated normal to the stretching direction.

The physical structure of fibers is drastically altered by changing the process conditions during melt spinning [58]. It was observed that little or no crystallization takes place at the highest spinning speed (10% at about 1500 m/min.) and this is little affected by throughput rate or the spinning temperature. The fibers spun at maximum speed cooled most rapidly. Considerable crystallinity levels were obtained during isothermal spinning especially when the take up speed was increased. The temperature at which the maximum rate of crystallization occurs was observed to be higher in the presence of stress in the spinline. The critical stress required for any crystallization to occur was found to be 0.08–0.09 g/denier [59]. Structure development during low speed isothermal spinning was observed to be similar to that of high speed spinning [60]. The windup speed and residence time of fiber in the oven influenced the final percent crystallinity value and orientation. The increase in rate of crystallization due to mechanical deformation above Tg was examined. An explicit equation for spherulite growth rate was developed in terms of experimentally measurable quantities.

The rate of crystallization of PET is highly dependent on orientation [61]. Nucleation and growth of crystallites occurred in milliseconds in oriented PET compared to minutes for unoriented PET. The main effect of orientation was to bring the molecular chain segments close together to reduce the configurational entropy thereby reducing the induction time for nucleation and crystal growth. The orientation of crystals in semicrystalline samples depends on the orientation of amorphous segments prior to crystallization.

The shrinkage and chain folding in drawn PET fibers was studied by Wilson [62]. The overall shrinkage process involved a rapid shrinkage due to the disorientation of frozen amorphous segments that results in fiber shrinkage. If the time and temperature are appropriate this is followed by crystallization.

The role of stress induced crystallization on the dimensional stability of uniaxially drawn PET films was studied by Mascia et al [63]. It was concluded that the level of shrinkage is independent of temperature up to 150° C. The thermal shrinkage was the highest for 2:1 draw ratio for a drawing temperature of 100° C. and below the glass transition temperature of PET. The drawn samples became dimensionally stable as indicated by the total percent crystallinity value of 43% that could be obtained only by annealing.

The thermotropic liquid crystalline polymers (TLCP) are widely used in blends with other compatible engineering polymers in the range of 5 to 30 weight percent [64]. The addition of LCP results in enhanced processing and reinforcement of the base polymer. The disadvantages are prohibitively high resin cost, special processing equipment and brittleness of the polymer blends. However, these LCPs find usage in high value added products where performance overrides the price. LCPs are commercially used in the form of films and fibers. The addition of small amounts of LCP significantly affects the processibility and a reinforcing microfibrillar morphology is obtained. However, the interfacial adhesion between the components was observed to be very poor resulting in highly anisotropic and brittle materials.

The high strength and modulus of fibers/films of PET/LCP blends is due to the molecular orientation of the mesophase during processing [67]. The unique properties of LCPs are their reinforcing nature and the ability to reduce the melt viscosity of the concerned polymer systems. Blending did not result in any change in transition temperatures ($T_m$ & $T_i$) of the components in the solid and the melt region. The PET and LCP components remain separate, thermodynamically stable, immiscible phases throughout the temperature changes.

Blends of PET with several LCPs were studied [69]. The crystallization temperature on heating ($T_{ch}$) decreased and the degree of crystallinity increased on adding LCP to PET indicative of LCPs nucleating effect.

The mechanical and thermal properties of PET fibers depend largely on the crystal structure, size and orientation of the crystallites and the amorphous regions within the fiber. The crystal structure of drawn PET fibers was studied by Daubney et al [74]. The high melting point of PET is due to the rigidity of the aromatic group and not due to intermolecular forces. At low draw ratios, a fiber of high orientation and little or no crystallinity was produced as determined by IR dichroic measurements. Drawing results in entanglements between molecules as determined by stress-strain curve as no crystallization or chemical crosslinks occurred. Evidence for this result was also obtained from NMR studies that showed close approach of neighboring atoms. At high draw ratios, reinforcement of structure could take place through stress-induced crystallization.

The effect of annealing on the structure of drawn PET fibers was studied by Fischer et al [76]. It was observed that the main effect was the perfection of crystals arranged normal to the fiber axis. The crystal size was also found to increase with increase in annealing temperature.

A three-phase model for PET was proposed by Fu [78]. This included a crystalline phase, an amorphous phase and an oriented amorphous phase known as "rigid amorphous" phase. Subtraction of the crystalline portion from the total X-ray diffraction pattern provided information about the structure of the non-crystalline phase. The azimuthal scattering pattern of the amorphous phase was observed to be isotropic whereas that of oriented non-crystalline phase was observed to be anisotropic. The rigid amorphous phase not only had the molecules aligned in the fiber direction but also correlated with crystal orientation. This intermediate phase is thought to be influential in the crystal growth, and the amount and structure is dependent on the mechanical and thermal history of the fiber. The structure-property correlation of PET is better explained by the three-phase model compared to the conventional two-phase model.

Melt blowing is one of the fastest growing processes for nonwoven production. Although poly(ethylene terephthalate) [PET] is melt blowable, it has a disadvantage that melt blown PET fabrics exhibit poor dimensional stability at temperatures above $T_g$. This is due to the negligible crystallinity in the final product, which is a result of the absence of stress induced crystallization. The spinline stress is very low due to the fact that there is no positive take-up mechanism unlike in melt spinning. Apart from this, the process is very rapid for any thermally induced crystallization and micro structure development to occur on the spinline.

Generally, PET has a very poor tendency to crystallize upon cooling from the melt. Although PET has polar groups, the rigidity of the benzene rings prevents the formation of regular chain folds and proper packing of molecular chains essential for crystal growth. Thus the overall crystallization rate of PET is slower than that of other common flexible polymers used in fiber production.

SUMMARY OF THE INVENTION

The nucleating ability of various commercially available additives can be exploited in situations where the level of spinline stress of a polyester fiber is low as in melt blowing. Kinetic studies confirm the fact that the overall crystallization rate of the system with potential nucleating additives is much higher than that of pure polymer, such as PET.

Improving the dimensional stability of melt blown and spun bond polyester fibers, and webs and fabrics made from these fibers, has been accomplished by enhancing the overall crystallization rate of the polyester, such as PET, by the incorporation of nucleating agents during processing. Fibers which can benefit from the invention include PET and homologues of PET, such as PPT and PIPT, and co-polymers thereof. Any polymeric fiber of the polyester series which undergoes shrinkage will benefit from the incorporation of nucleating agents into the polymer. Generally, fibers which are subject to dimensional stabilization by the method of the invention include fibers made of those polyester polymers which contain a benzene ring or side chain which inhibits the crystallization of the fibers.

Nucleating agents are incorporated into the fiber, such as PET, during processing of the fiber to act as seeds for crystallite formation. The percentages of crystalline and rigid amorphous material present in the fibers determine the shrinkage values at temperatures above glass transition. The presence of crystallites stabilizes the filaments within the fibers by acting as anchoring or tie points between filaments, thereby inhibiting the motion of filaments relative to one another, and thus preventing shrinkage of the fibers.

The incorporation of nucleating agents into the polymer also results in the practicability of higher speeds of formation of fibers. Rate of formation of fibers is limited by rate of crystallization because a too rapid draw will result in tearing. An increased rate of crystallization causes a decreased tendency of the fibers to tear at high processing speeds.

For purposes of the invention, a suitable nucleating agent is one which, when incorporated into a polymer, does not melt during polymer processing temperatures, provides good surface (with matching dimensions) for polymer molecules to deposit and grow, is able to chemically interact with the polymer, and is able to be finely dispersed in the polymer.

An effective screening method for determining whether a compound will function as a suitable nucleating agent to provide dimensional stability (prevent shrinkage) of a polymer fiber or fabric is as follows. The compound additive is added, or additives are added, to molten polymer, which is then allowed to cool. The Tcc is determined. A suitable nucleating agent will increase the observed Tcc of PET, that is it will shift the crystallization curve, illustrated by FIG. 3 for PET, to the left. If the Tcc does not increase, or if it decreases, the test additive is unsuitable as a nucleating agent. In a preferred embodiment, the nucleating agent is sodium benzoate.

An embodiment of the invention is a dimensionally stabilized polyester fiber which comprises a nucleating additive. In a preferred embodiment, the polyester is PET and the nucleating additive is sodium benzoate. Other suitable nucleating agents can be used in place of sodium benzoate. See Table 1, below. Other nucleating agents are disclosed in the references listed in the bibliography, each of which is expressly incorporated herein by reference. A multiplicity of nucleating agents can be used. In another preferred embodiment, the nucleating additive is a combination of sodium benzoate and a second nucleating agent.

Another embodiment of the invention is a shrink-resistant non-woven web or fabric, which may be a melt-blown or a spunbond web or fabric, which comprises dimensionally stabilized polyester fibers containing a nucleating additive or a multiplicity of nucleating agents, such as a combination of sodium benzoate and a second nucleating agent. The web or fabric may be a single layer or may be multi-layered. The multi-layered web or fabric may contain melt-blown or spunbond layers, or a combination of melt-blown and spunbond layers. The webs or fabrics produced from the fibers of the invention are suitable for use where the webs or fabrics might be exposed to high temperatures, that is above 70° to 80° C. Such products include but are not limited to filters, such as those used in automobiles, roofing materials, and apparel.

A third embodiment of the invention is a method for the compounding of a nucleating agent into a polymer. In a preferred embodiment, a co-rotating twin screw type extruder was used to thoroughly melt mix the polyester with the nucleating additive. In a preferred embodiment, the nucleating agent incorporated into the polymer is sodium benzoate and the polymer is PET.

In the following Detailed Description of the Invention, the method and compositions of the invention are exemplified using PET as the polyester and sodium benzoate as the nucleating agent. It is understood by those skilled in the art that other suitable polyesters and other suitable nucleating agents may be substituted in place of PET and sodium benzoate with similar results.

DETAILED DESCRIPTION OF THE INVENTION

Materials

Figure 1:
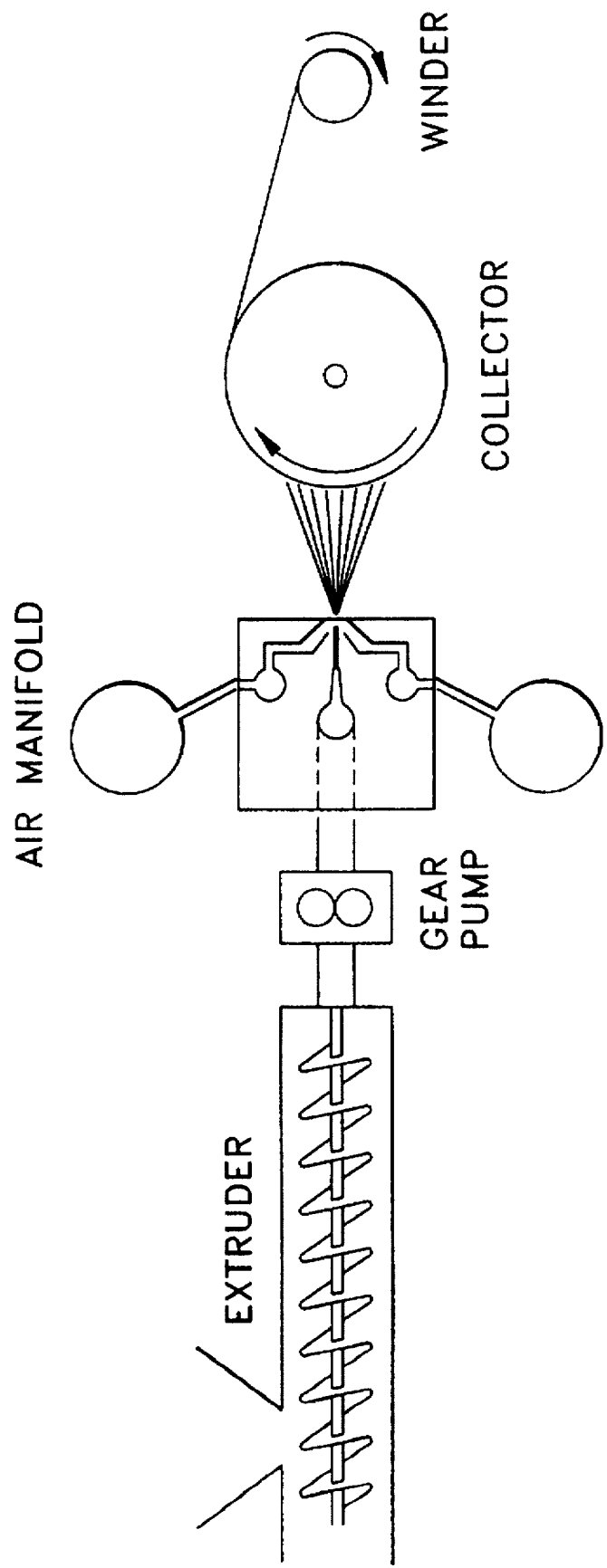
FIG. 1 shows Schematic of the Melt Blowing Process.
Figure 2:
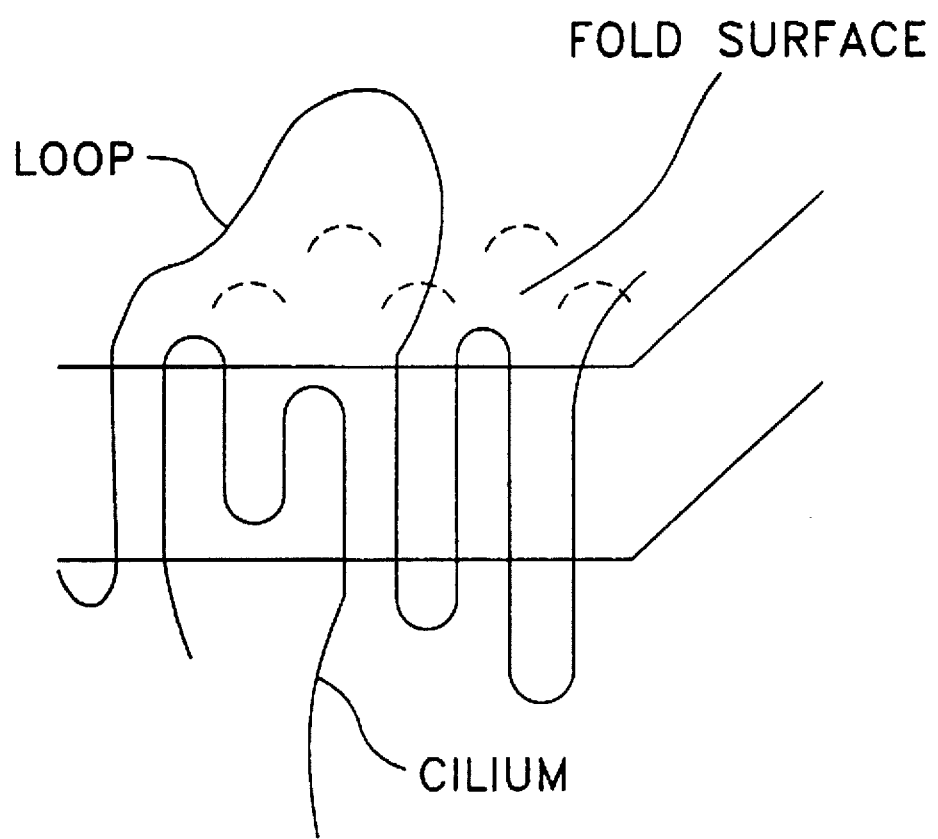
FIG. 2 shows Crystalline Model for polymers.

A solid state polymerized PET of intrinsic viscosity 0.9 was used for this study. The additives compounded with the polymer include an organic salt, an inorganic compound, a thermotropic liquid crystalline polyester and an ionomer. The chemical structure, trade name and source are given in Table 1.

Procedure 4.2.1. Injection Molding

The additives were tested for their nucleating ability by injection molding with PET and characterizing the molded samples. The process conditions shown in Table 2 were kept constant for all samples to make an absolute comparison. A total of 12 samples were produced as shown in Table 7, below. Prior to the runs, PET and LCP were dried at 120° C. and the ionomer at 60° C. for 12 hours. At first, PET was injection molded without any additives. In the successive runs, PET was dry blended with different additives in appropriate weight percentages. In between the runs, neat PET was used to purge the materials in the screw to avoid any contamination. The injection molded samples were sealed air-tight for further characterization.

4.2.2. Compounding of PET with additives

The successful nucleation additives, sodium benzoate and LCP were compounded with PET pellets in a twin screw extruder. The conditions of extrusion were kept the same for all samples as shown in Table 3. A co-rotating twin screw type extruder was used to thoroughly melt mix PET with the nucleating additives. Initial runs of PET dry blended with additives in the hopper of a six-inch melt blowing equipment yielded poor quality webs. This is the reason for thoroughly mixing the solid additives with PET in a twin screw extruder. The compounded materials were quenched in a water bath prior to pelletizing. The pelletized samples were tightly sealed to prevent moisture uptake.

4.2.3. Melt blowing of PET compounded with additives

The compounded PET samples were melt blown into fine quality webs using a six-inch wide die. The process conditions as shown in Table 4 were kept constant for different samples produced to make an absolute comparison between samples. Prior to processing, the compounded PET pellets were dried at 120° C. for 12 hours. Unlike our previous experience on injection molding machine and the twin screw extruder, processing problems like flies and change in web density were encountered on switching from PET to PET with additives. Utmost care was taken to produce uniform and good quality webs. It was very difficult to control the web thickness and basis weight of the webs produced. This could be attributed to the poor draw down of the LCP component in the blends. When LCP was tried alone without any additives, poor quality mat with very large but strong fibers were obtained.

4.2.4. Melt blowing of PET without additives

In order to investigate the effect of process variables such as throughput rate, air pressure at the die, die temperature, air temperature and the die-to-collector distance on the properties of the melt blown webs, PET melt blown webs without any additives were prepared varying the above mentioned factors at two levels. The details of the melt blowing run are shown in Table 5. Due to the complexity of the process like the interaction between the air temperature, air velocity and throughput rate, production of controlled samples was difficult. However, efforts were made to produce control webs of almost same thickness and density.

Characterization Techniques 4.3.1. Thermal Analysis

Injection Molded Samples

A DSC 25 with Mettler TA 4000 controller was used to characterize the injection molded specimens of almost same thickness and a sample mass of approximately 15 mg. An inert environment was maintained throughout the scan to avoid thermal degradation. Both non-isothermal and isothermal kinetics were performed using the DSC. For non-isothermal studies, the samples were scanned at a rate of 20° C./min. PET samples were held at 300° C. in the DSC cell for 3 minutes for complete melting of crystals. Cooling rates of 20°, 40°, 60° C./min. were used. Isothermal studies were done by measuring the time taken for 50% crystallinity to develop at 232° C. A cooling rate of 20° C./min. from the melt kept at 300° C. for 3 minutes was used to reach the desired isothermal temperature.

Melt Blown Samples

A DSC 25 with Mettler 4000 control system was used for the thermal characterization of as-produced melt blown webs without any additives. A nitrogen atmosphere was used throughout the study. A sample mass of 10 mg was used. Samples were heated at a rate of 20° C./min. from 50° to 300° C. A DSC 20 was used for analyzing the melt blown samples with additives. The same conditions of testing was followed. The percent crystallinity from the heating and cooling DSC curves was calculated according to the formula $$X_c (\%) = [(\Delta H_{ex}/\Delta H_{th}) \times (1/(1-b)) \times 100] \quad (17)$$

where $X_c$ is the percent crystallinity; $\Delta H_{ex}$ is the experimental heat of fusion determined from the DSC curves; $\Delta H_{th}$ is the theoretical heat of fusion determined from ATHAS tables [78] and b is the weight percent of the additive.

$$\Delta H_{ex} = \Delta H_m - \Delta H_c$$

where $\Delta H_m$ is the heat of fusion of the melting endotherm in J/g and $\Delta H_c$ is the heat of fusion of the crystallization exotherm in J/g.

$$\Delta H_{th} = H_c - H_a$$

where $H_c$ is the enthalpy in J/g for a 100% crystalline solid and $H_a$ is the enthalpy in J/g for a 100% mobile amorphous liquid.

4.3.2. Shrinkage Studies

The thermal shrinkage of melt blown PET webs was determined in the machine direction according to the formula $$\% \text{ Shrinkage} = [(\text{Original length} - \text{Final length})/ \text{Original length}] \times 100 \quad (20)$$

Samples were annealed without tension at 110°, 150° and 190° C. for 3 minutes in a vacuum oven. In the case of melt blown PET with additives, because of the difference in thickness of the webs, the samples were kept in the oven for the duration corresponding to the thickness of the samples as shown in Table 6. The mean thickness of 5 samples was determined. The samples annealed at different temperatures were tightly sealed for further analysis. The shrunk samples were characterized using DSC to study the amount of different entities present in the fibers.

Results and Discussion
Injection molded PET samples

Figure 3:
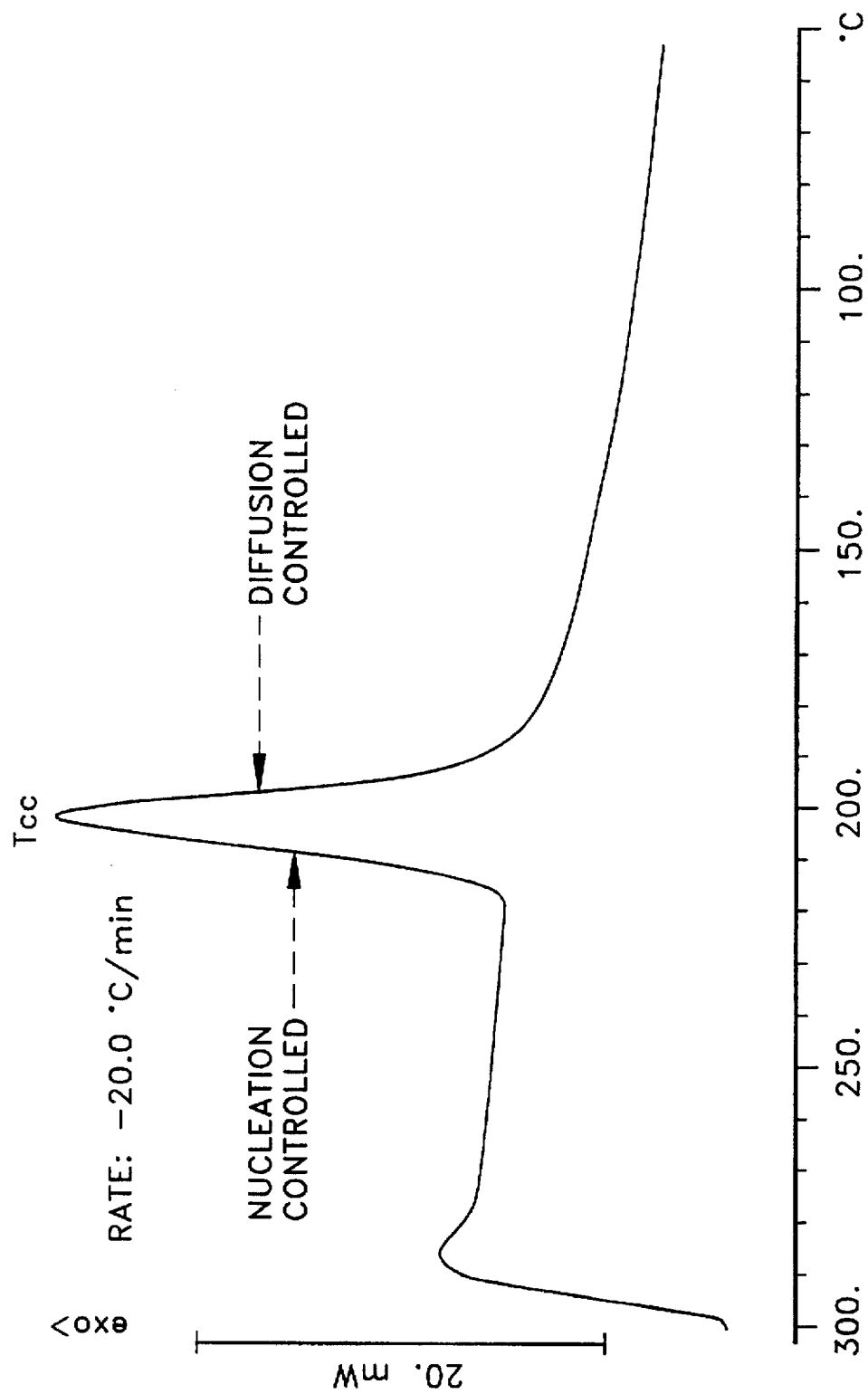
FIG. 3 shows Crystallization behavior of PET on cooling from the melt.

The non-isothermal cooling behavior of PET from the melt is shown in FIG. 3. The polymer was cooled from 300° C. to 50° C. at a rate of 20° C./minute. As we know, ordering of polymer molecules results in a release of heat and thus the polymer crystallization is an exothermic process. As shown in the figure, two mechanisms become operative: the left hand portion of the curve is dominated by the nucleation mechanisms and the right hand portion of the curve by the growth and diffusion mechanisms (viscosity dependent). The effect of a nucleating additive is to shift the $T_{cc}$, the temperature of maximum crystallization on cooling, to higher temperatures. The $T_{cc}$ values for injection molded PET samples with different additives are shown in Table 7. The samples were cooled at 20°, 40° and 60° C./minute from 300° C. to 50° C. after being held at 300° C. for 3 minutes. There was a shift of about 16.5° C. for PET mixed with 2% sodium benzoate. The trend is the same for increased cooling rates. Thus, it is evident that sodium benzoate acts as an efficient nucleating agent in commercial PET processing where the cooling rate is of the order of several hundred degrees per minute. LCP, ionomer and copper sulfate pentahydrate alone did not show any significant nucleating ability. But, when LCP was combined with sodium benzoate, a synergism in nucleation was seen with a temperature shift of 15.5° C. at a cooling rate of 20° C./minute. LCP alone crystallized at a temperature much higher than that of pure PET. However, the heat of fusion value was negligible when compared to that of PET.

Figure 4:
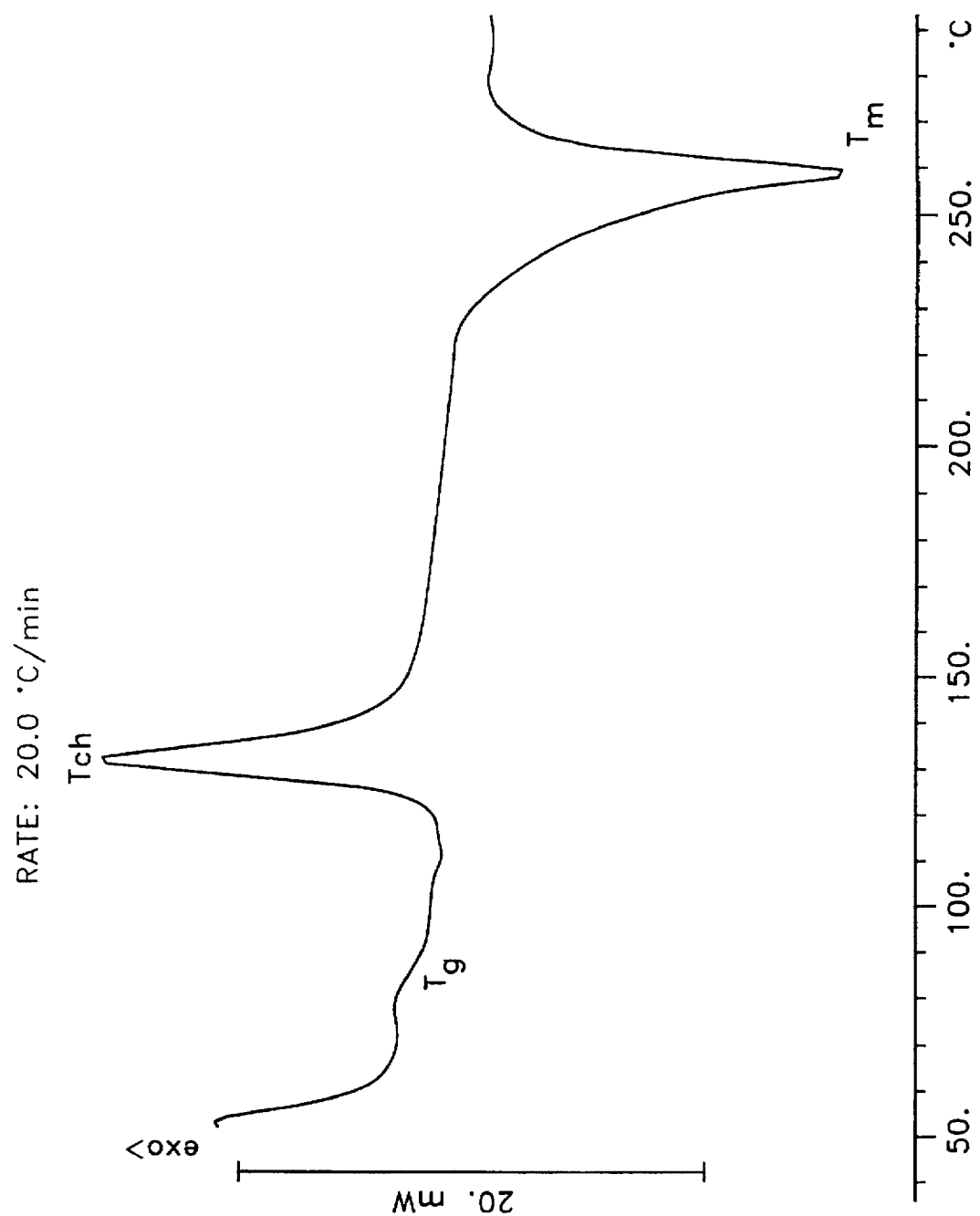
FIG. 4 shows Crystallization behavior of PET on heating from the glassy state.

FIG. 4 illustrates the typical heating curve (20° C./minute) for an injection molded amorphous PET sample. It consists of a $T_g$ at 80° C., a crystallization exotherm at 129° C. and a broad melting endotherm with a melting point at 257° C. The effect of nucleating additive is to decrease $T_{ch}$ and increase $T_m$. As can be seen from Table 8, a decrease of about 11.8° C. was observed for PET sample injection molded with 2% sodium benzoate. The melting point increased by about 4.2° C. The synergistic effect of adding sodium benzoate with PET/LCP blends is also seen by the reduction of about 9.6° C. in $T_{ch}$ and an increase of 3.4° C. in $T_m$. LCP, ionomer and copper sulfate pentahydrate alone did not haisotro visible influence on $T_{ch}$ or $T_m$. LCP had an isotropization temperature ($T_i$) of 276° C. where the crystal to nematic transition took place. Table 8 also contains the percent crystallinity values from heating and cooling curves.

Figure 5:
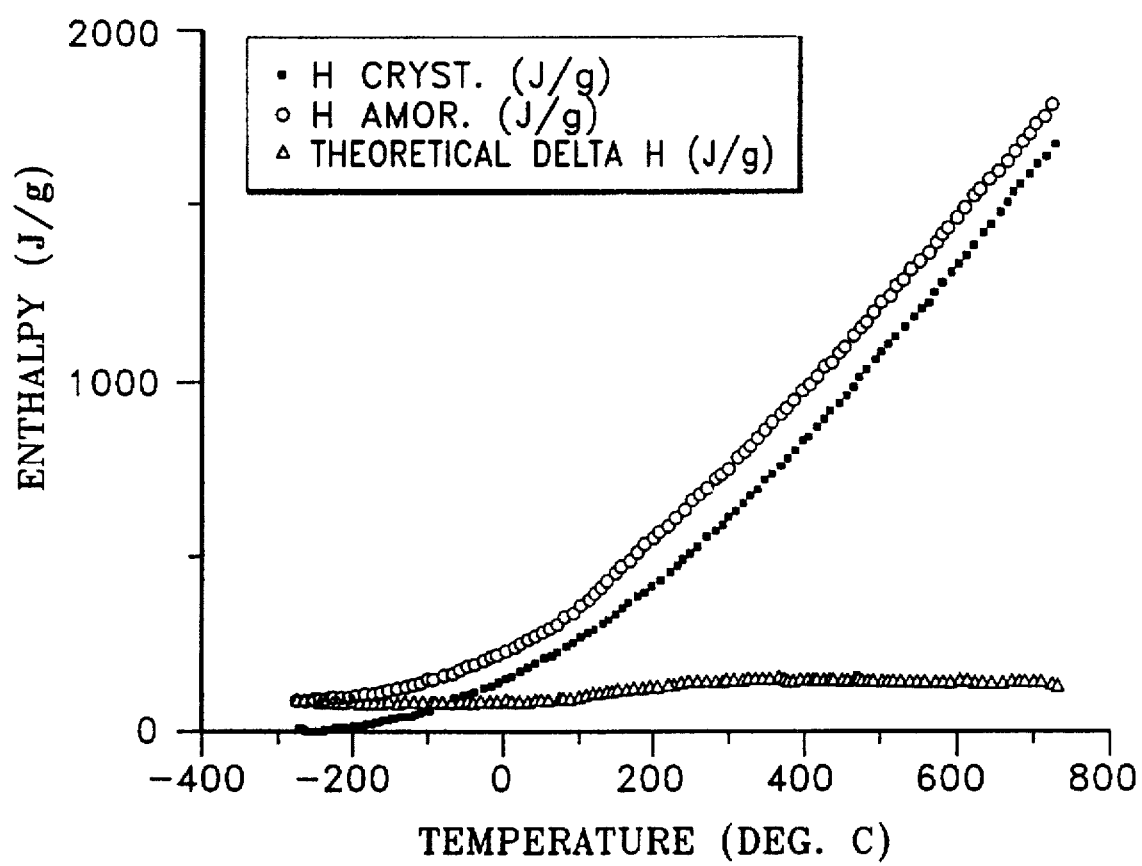
FIG. 5 shows Enthalpy Vs. Temperature for PET (Theoretical).
Figure 6:
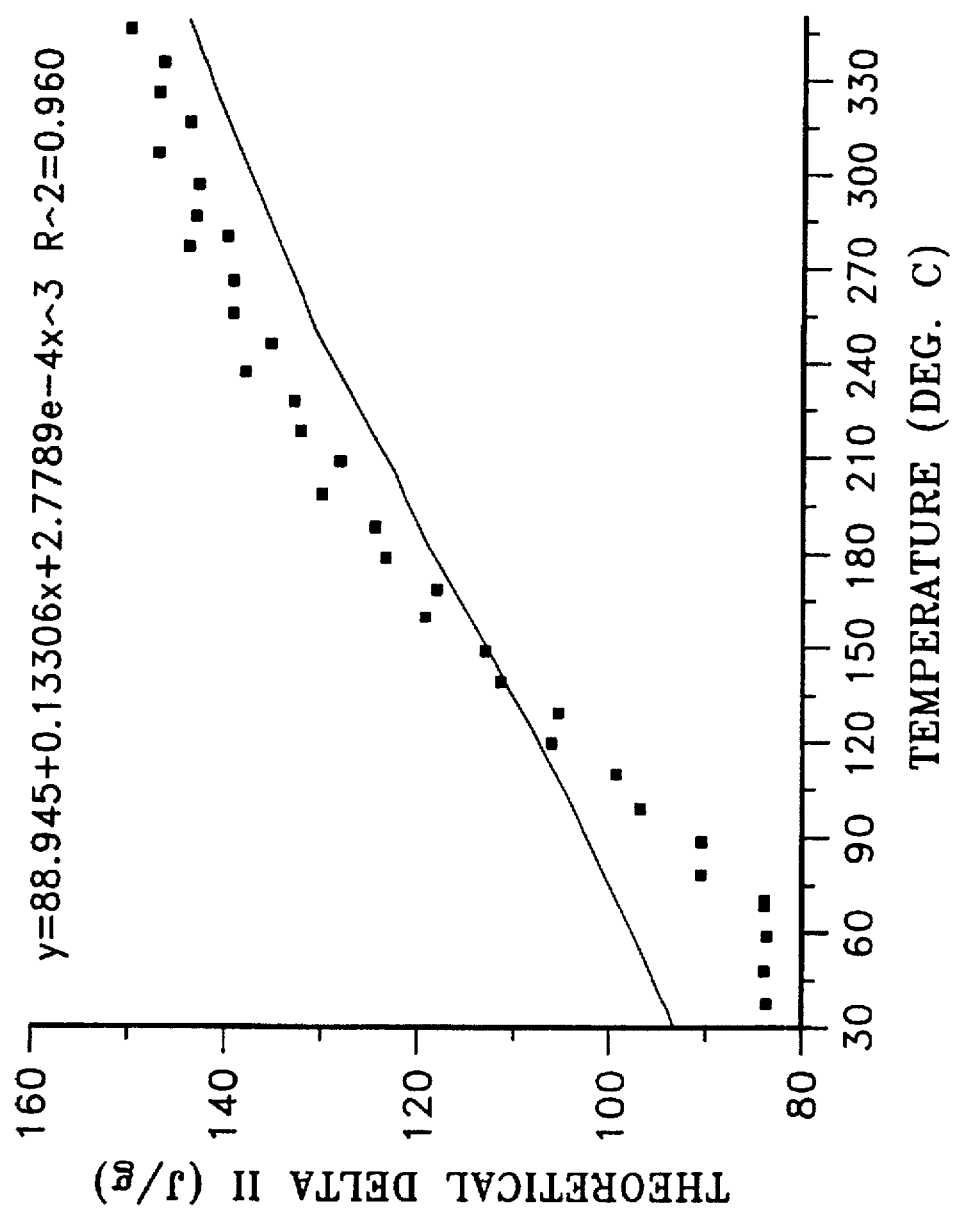
FIG. 6 shows Theoretical Delta H Vs. Temperature for PET.

A frequent mistake made in calculating the percent crystallinity is the assumption that $\Delta H_{th}$ is constant over a wide range of temperatures. But, according to the ATHAS table of thermal properties [80], $\Delta H_{th}$ is in fact a function of temperature. FIG. 5 illustrates the change in enthalpy of solid, a 100% crystalline material and that of a liquid, a 100% amorphous material with temperature. The liquid heat capacity is always higher than that of the solid because of the unrestricted motion of the molecular segments. The theoretical heat of fusion has a cubic function with temperature as shown in FIG. 6. Since the difference between the transition points ($T_m$, $T_{ch}$ and $T_{cc}$) is only of the order of a few degrees, a linear function was assumed between consecutive points in calculating the percent crystallinity. A lower value of $\Delta H_{th}$ was obtained at $T_{ch}$. Assuming a constant value for $\Delta H_{th}$ would result in an error of over 20%. This correction procedure was used for every temperature while calculating the percent crystallinity values. The contribution of additives in the calculation was eliminated by subtracting the weight percent of additives from the theoretical heat of fusion. This way, the crystallinity values obtained were that of the PET component only.

As shown in Table 8, no crystallinity was detected for pure PET injection molded specimens, suggesting that the samples were essentially amorphous. The PET sample with 2% sodium benzoate had the higher percent crystallinity values. No crystallinity was detected for samples with low weight percent LCP. Samples with the copper sulfate additives were brittle indicative of crystalline fraction although it was much smaller than that containing sodium benzoate. All the samples with more than two components showed synergistic effect. The additives were chosen for compounding with PET based on their nucleation efficiency. Thus it could be seen that sodium benzoate is the most successful additive followed by LCP, copper sulfate and the ionomer. The percent crystallinity values for different samples on cooling from the melt at 20° C./minute are almost the same indicative of the fact that although the nucleation rate increases in the case of additives, the growth rate remains the same.

Figure 7:
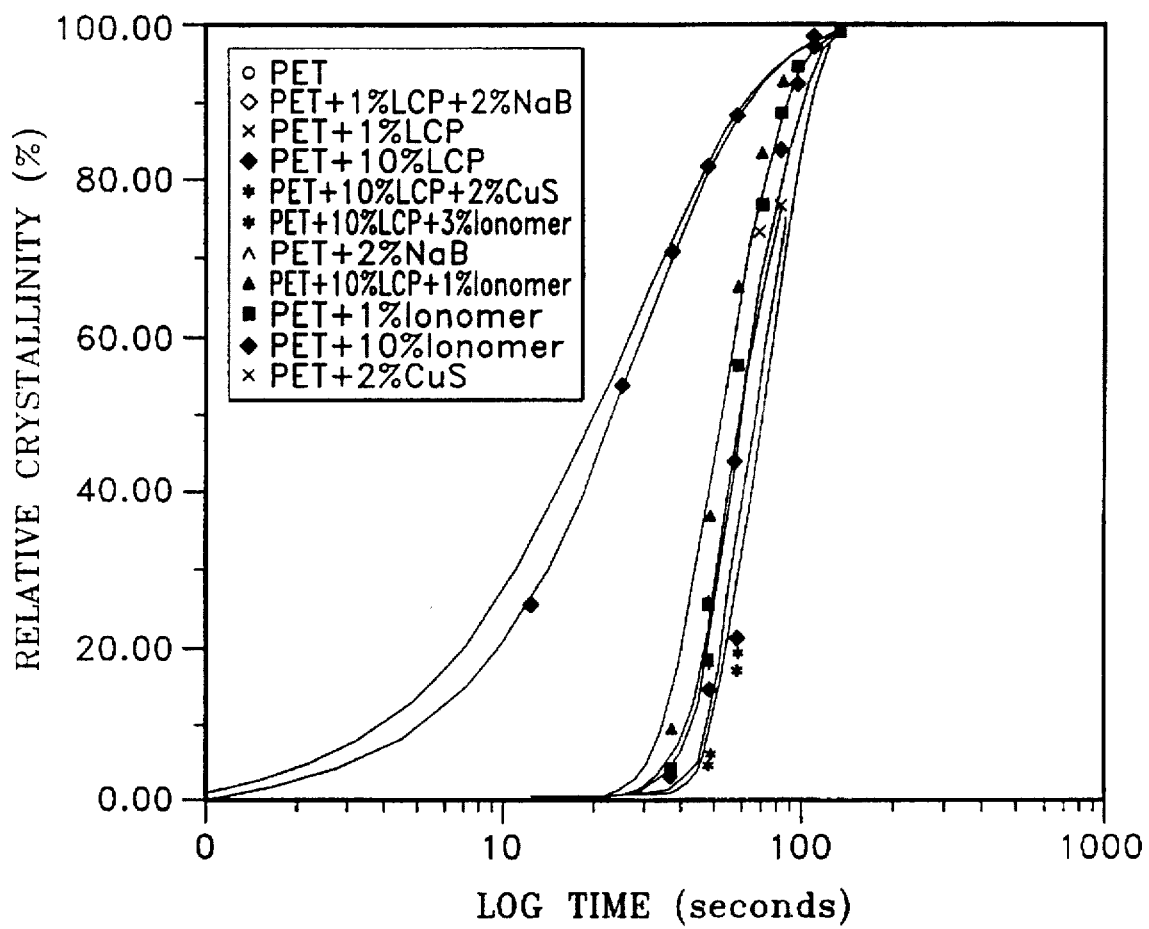
FIG. 7 shows Non-isothermal Kinetics of PET injection molded samples with additives.
Figure 8:
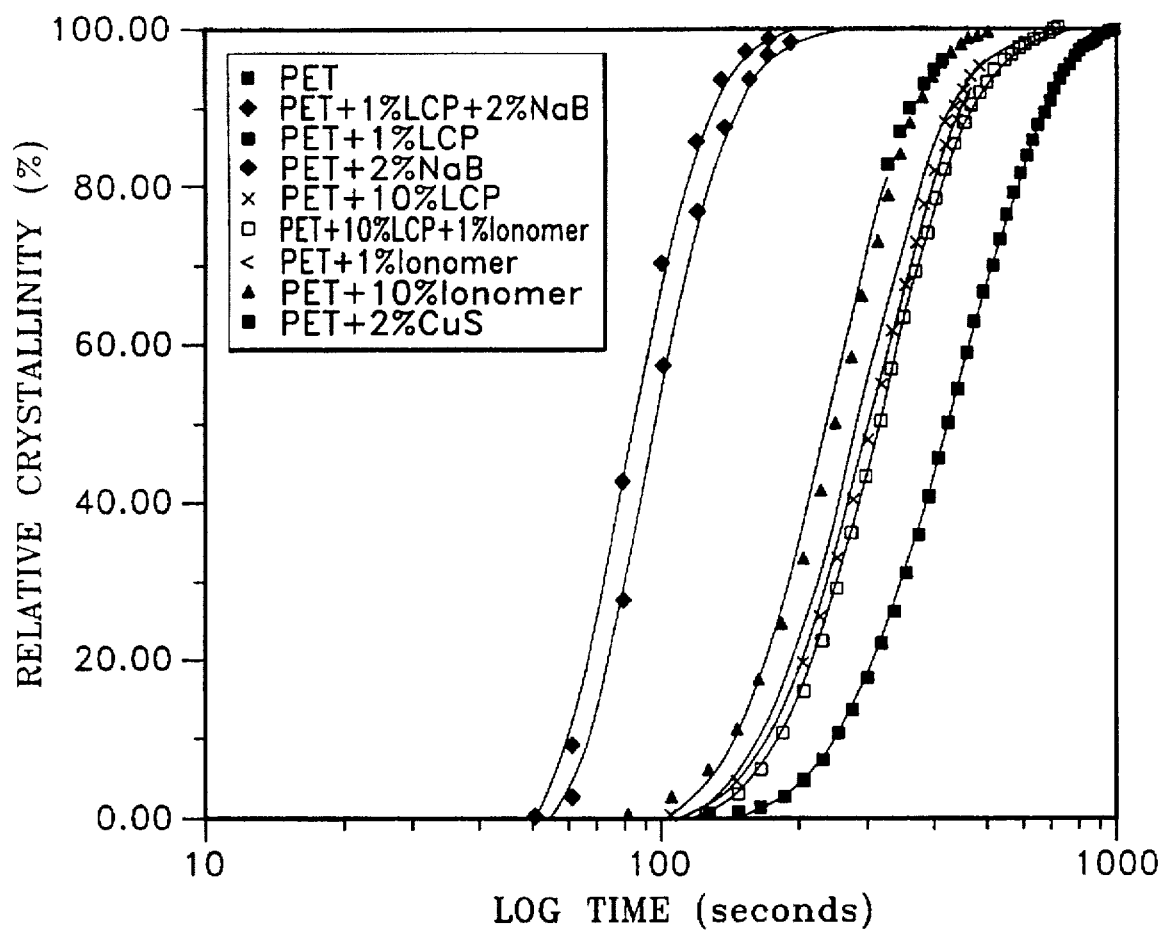
FIG. 8 shows Isothermal Kinetics of PET injection molded samples with additives.

The non-isothermal and isothermal kinetics determined from DSC are shown in FIGS. 7 and 8 respectively. The sigmoidal shape of the curves is typical of polymer crystallization. The relative crystallinity values were calculated by partitioning the area under the crystallization peak on cooling from the melt, in this case, cooled at a rate of 20° C./minute, into small areas and dividing each area by the total area of the peak. It can be seen from the figure that PET with sodium benzoate had considerably higher percent crystallinity values by the time the other samples started to crystallize. This indicates the increase in overall crystallization rate of PET with sodium benzoate, and PET with LCP and sodium benzoate. All other additives fall in the same area as that of pure PET. Isothermal kinetics were performed at 232° C. The exotherm was allowed to reach the base line before useful calculations were made. As can be seen from FIG. 8, crystallization rate of PET with successful additives was much higher than that of the unsuccessful additives. The potential nucleating additives and their combinations were thus obtained from these experimental investigations using the kinetic studies. It was tactfully assumed that the higher crystallization rate of PET samples with additives would prevent the shrinkage of PET during further thermal treatment.

PET Melt Blown webs with nucleating additives

Figure 9:
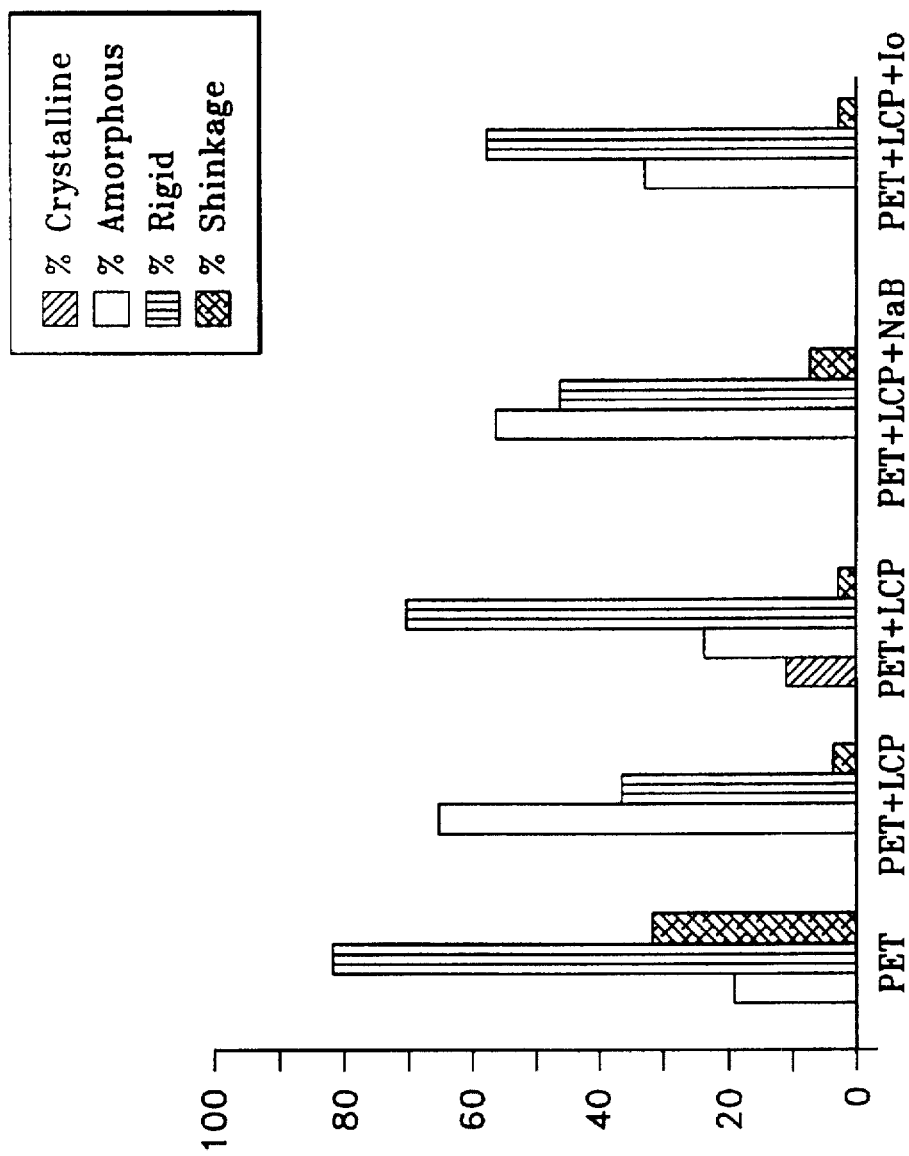
FIG. 9 shows Percent Crystalline, Amorphous, Rigid Amorphous and Shrinkage of PET webs with additives.

Table 9 and FIG. 9 show the DSC results of different melt blown webs produced under identical processing conditions with nucleating additives. Almost all the additives showed nucleating ability as can be seen from the shift in $T_{ch}$. PET with 1% sodium benzoate produced a moderately crystalline web with 9.82 percent crystalline fraction. Other webs had essentially no detectable crystalline fraction. The additives, in fact, acted like diluents as can be seen from the reduction in $T_g$ values (Table 10). The crystals have a regular three-dimensional ordering with a definite melting point. The amorphous fractions have no order and become mobile at $T_g$. The rigid amorphous fractions resemble the crystallite in properties and become mobile between $T_g$ and $T_m$. The as-produced PET melt blown webs have a large fraction of rigid amorphous content that may be responsible for their high shrinkage values on further heat treatment. The least shrinkage value was obtained in the case of melt blown webs with PET and sodium benzoate although they had higher rigid amorphous content. Thus the shrinkage behavior of melt blown PET webs was found to be very different depending on the type of additive used and the amount of crystalline, amorphous and rigid amorphous present in the sample.

Figure 10B:
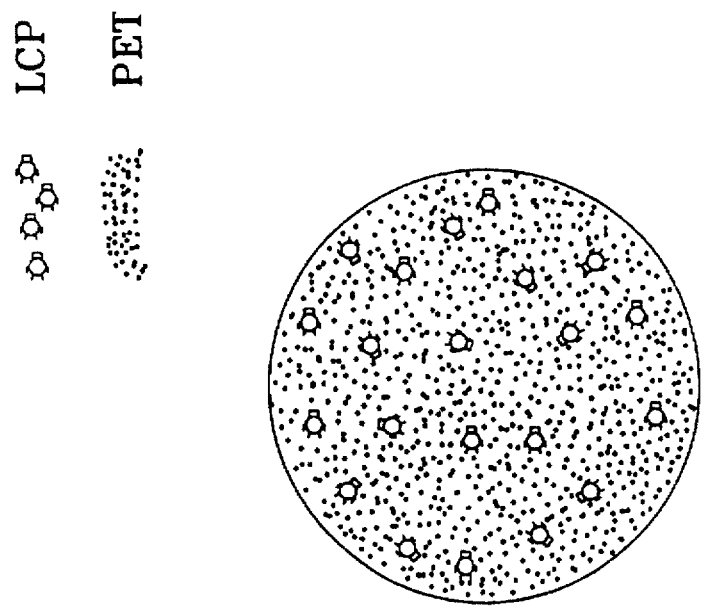
FIG. 10 shows Fiber Models for PET/LCP blends.
Figure 10A:
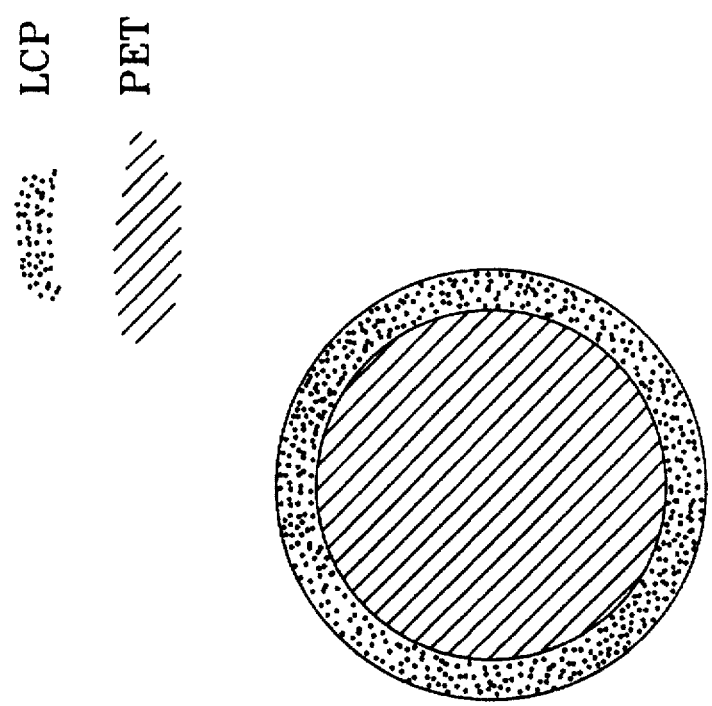
Figure 11:
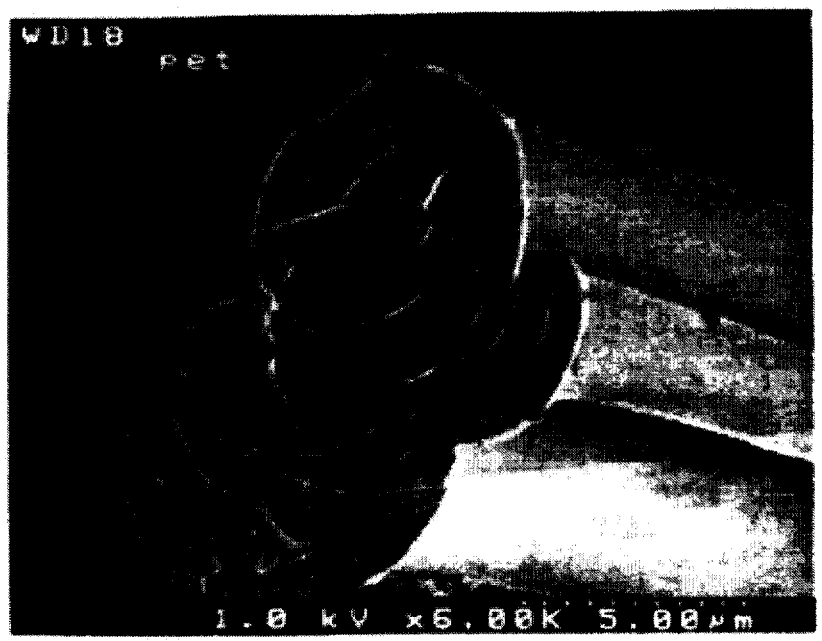
FIG. 11 shows Fracture Surface of PET Melt Blown Fibers with no additives (×6000).
Figure 12:
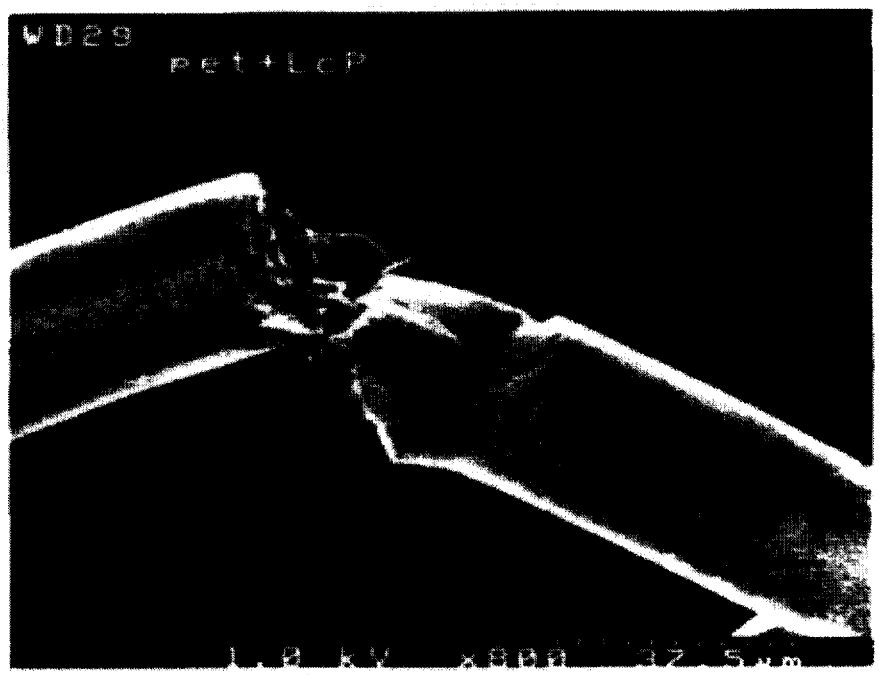
FIG. 12 shows Fracture Surface of PET Melt Blown Fibers with LCP Fibrils (×800).
Figure 13:
FIG. 13 shows Fracture Surface of PET Melt Blown Fibers with LCP Fibrils (×3000).

In the case of amorphous PET melt blown webs, the shrinkage could be attributed to the presence of large amount of oriented rigid amorphous fraction. There is no restriction on the motion of these rigid segments on exposure to heat because of the absence of crystallites as tie links. The crystallites already present in the web restrict the motion of the amorphous or the rigid amorphous molecules in the case of melt blown webs that contain PET in combination with sodium benzoate. In the case of PET melt blown fibers that contain LCP, the LCP component being of lower viscosity at the processing temperature range compared to PET, might encapsulate the PET phase forming a sheath-core composite structure. Two model structures were proposed for melt blown fibers with PET and LCP as shown in FIG. 10. In both the cases, PET component is prevented from shrinking by the rigid LCP phase. Thus the shrinkage values of the melt blown webs produced from blends were lower in all the cases with LCP as reinforcing phase. In fact, fracture studies performed on the melt blown fibers made of PET and PET/LCP blends revealed the evidence of a matrix-fibril type of composite fiber as shown in the SEM pictures (FIGS. 11–13). The droplets of the LCP component gets elongated into discontinuous fibrils within the matrix of PET as shown in the SEM pictures.

Figure 14:
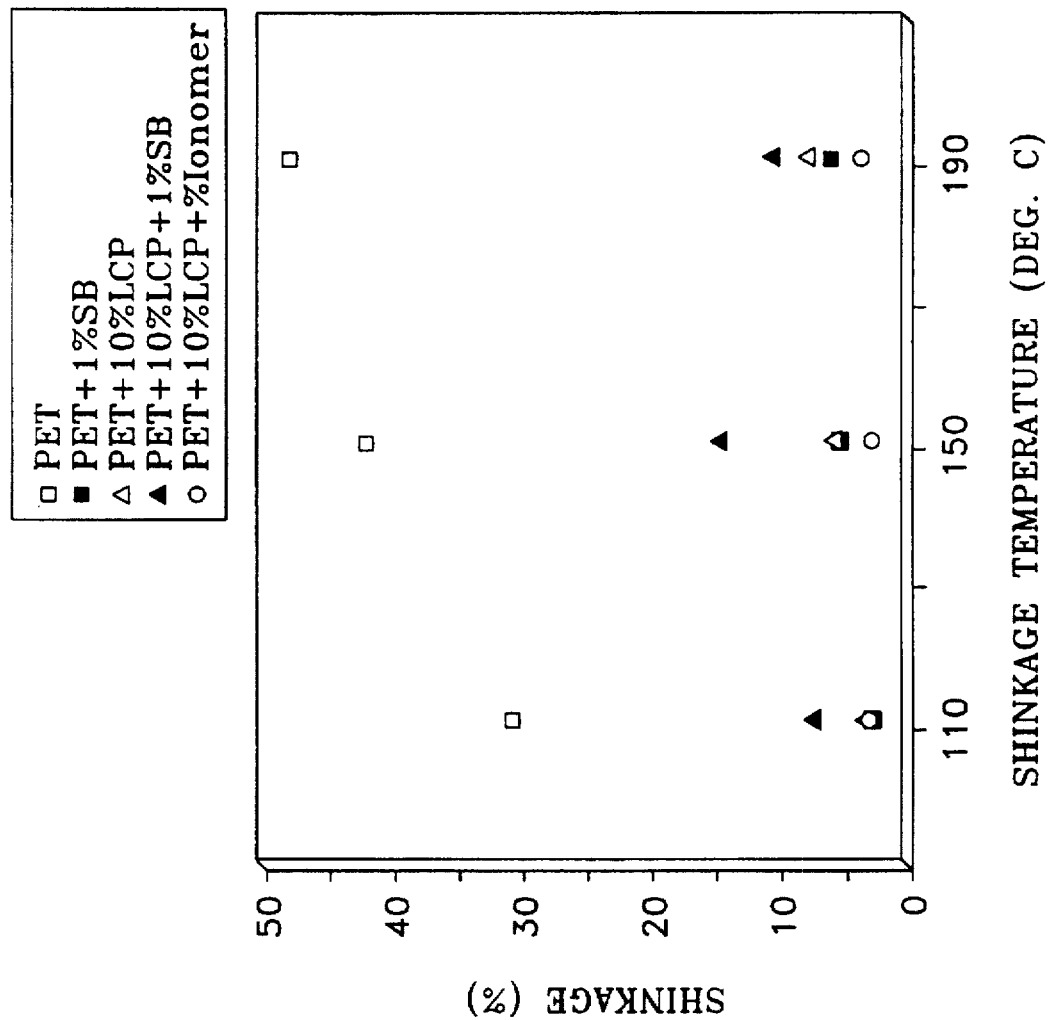
FIG. 14 shows The effect of temperature on the shrinkage of PET melt blown webs with additives.
Figure 15:
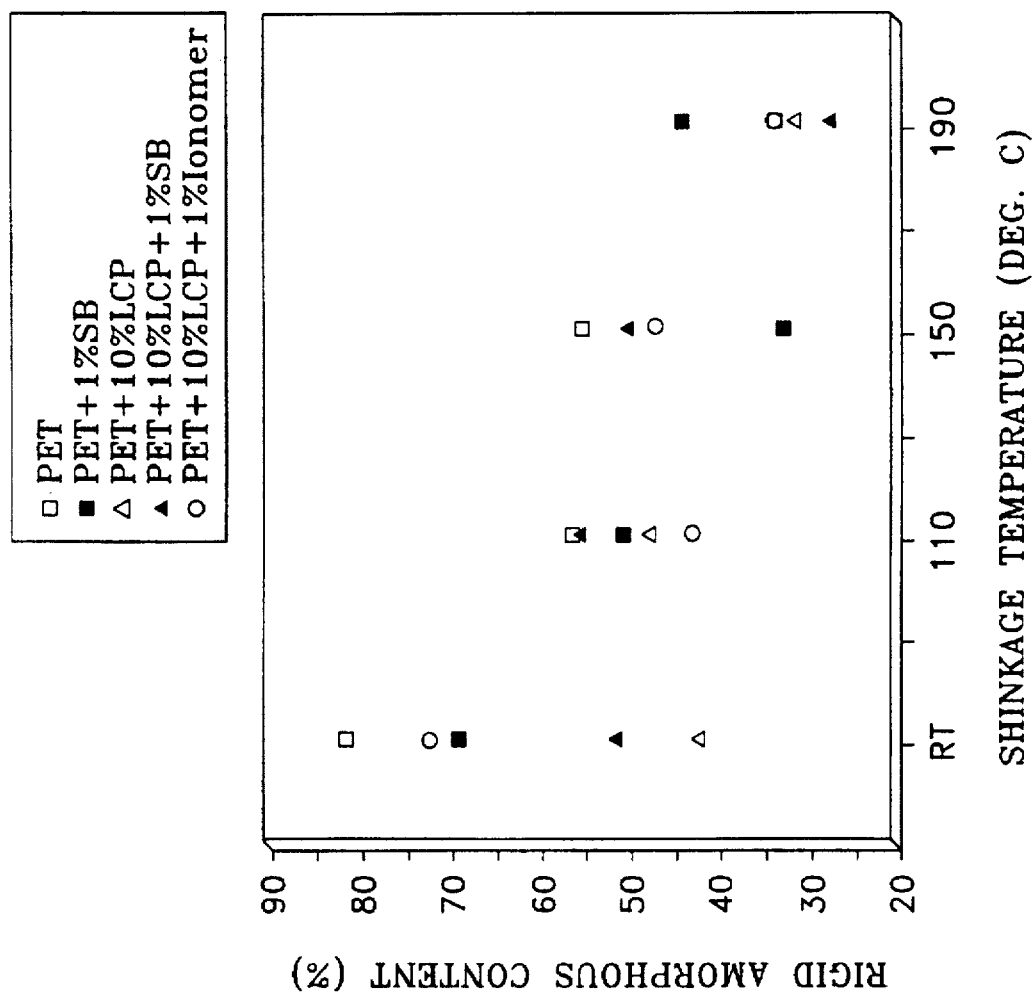
FIG. 15 shows The effect of temperature on the percent rigid amorphous content of PET melt blown webs with additives.

The shrinkage studies were also performed at 150° and 190° C. There was a considerable increase in the percentage shrinkage values in the case of PET fibers that contained no additives as shown in FIG. 14. Even at 190° C. the fibers made of PET and additives had exceptional dimensional stability with shrinkage values less than 10%. The fibers made of PET/LCP/Sodium benzoate had higher shrinkage values compared to the rest of the samples in the figure that contained additives. DSC was used to determine the relative amounts of crystalline, amorphous and rigid amorphous contents of the shrunk melt blown fibers. FIG. 15 illustrates the change in the percent rigid amorphous content with increase in shrinkage temperature. In all the cases, the samples were annealed with no constraint for the same period of time. PET fibers had considerably higher amount of oriented amorphous fraction compared to PET fibers that contained additives. Among the fibers that contained additives, PET/LCP had the lowest value suggestive of very low shrinkage values. Although, the rigid amorphous content was higher in the case of fiber that had PET/Sodium benzoate, shrinkage was prevented by the crystallites present in the as-produced fibers.

Figure 16:
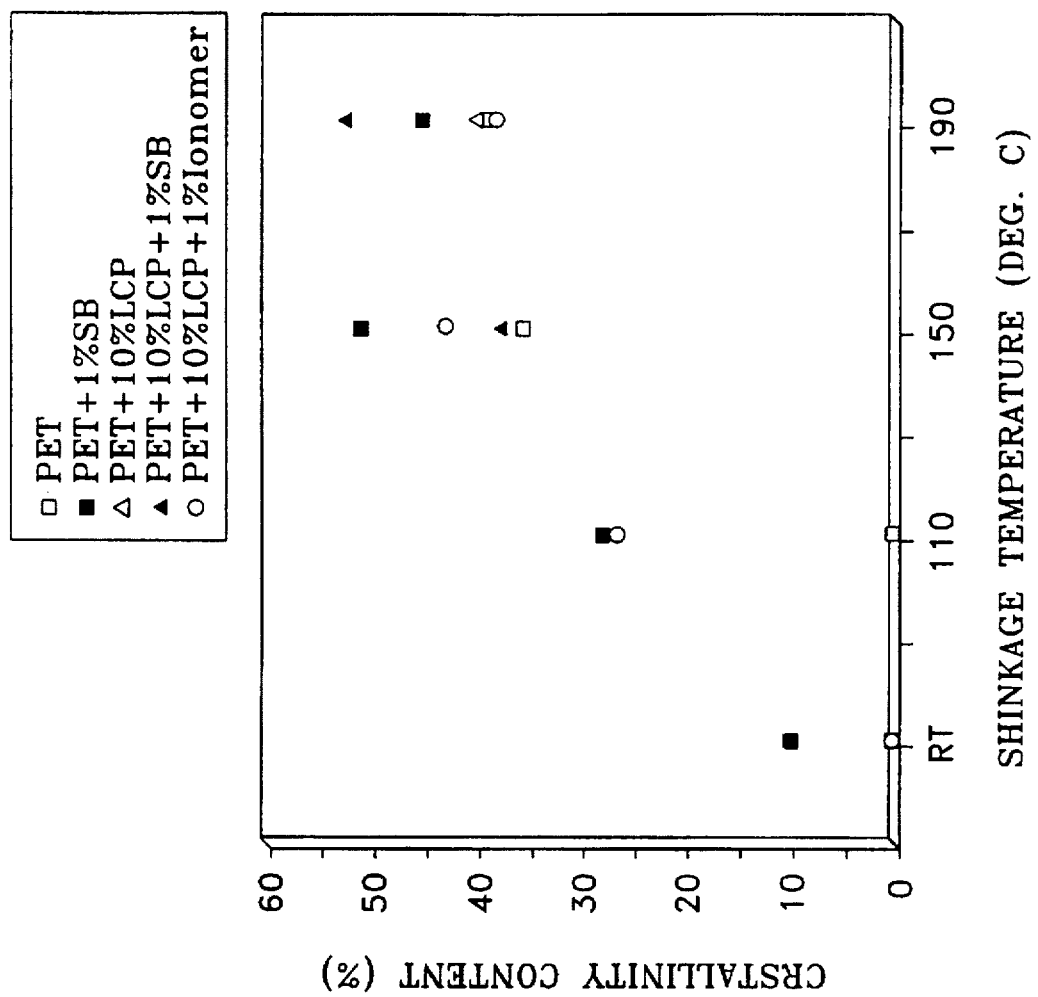
FIG. 16 shows The effect of temperature on the crystallinity of PET melt blown webs with additives.

The competing mechanisms of shrinkage and crystallization are very evident from the above figures. The reduction in the rigid amorphous content of all samples at temperatures at 110° C. is due to the disorientation of the oriented amorphous chains. At 110° C., this is presumed to be the dominant mechanism. At 150° C., the material is already crystalline (Tch being 130° C.), there is a further reduction in the rigid amorphous content. FIG. 16 illustrates the increase in crystallinity content of different samples on annealing. Crystallinity was detected only in the case of as-produced PET fibers that had sodium benzoate. The increase in crystallinity at 110° C. of all the samples other than PET is due to the presence of a greater number of nucleating sites on heating from the glassy state. This is also responsible for higher percent crystallinity values in the case of fibers that contained additives at higher shrinkage temperatures. Thus in the case of PET fibers that had no additives, the shrinkage is mainly due to disorientation at 110° C. and above and the level of shrinkage is determined by the shrinkage and crystallization temperatures and times during annealing. Presence of nuclei/additives influence a lot on the shrinkage and crystallization behavior the fibers. Thus having a crystalline material to begin with is crucial in further heat treatments like annealing to prevent thermal shrinkage.

Figure 17:
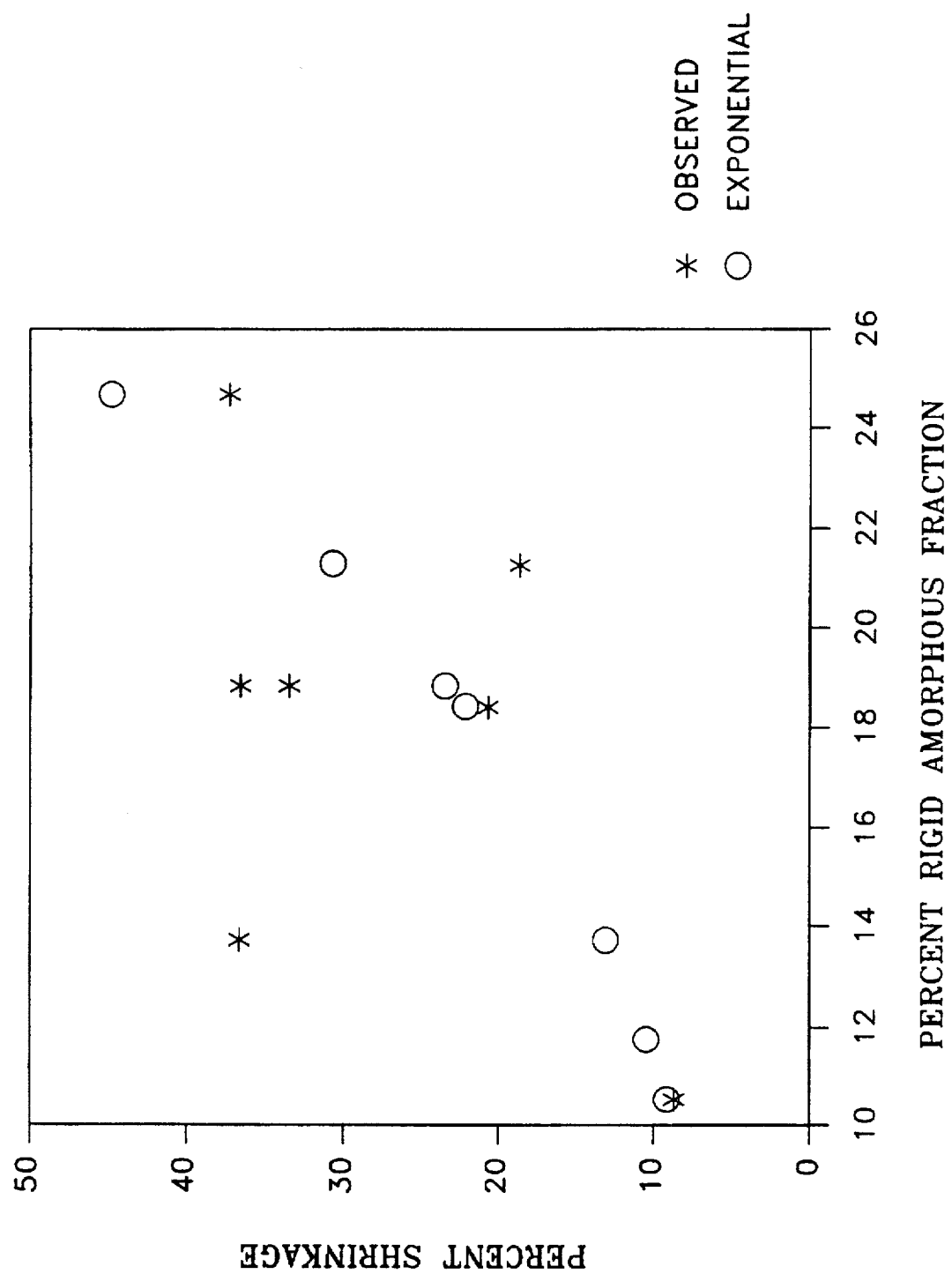
FIG. 17 shows Relationship between shrinkage and rigid amorphous content for PET melt blown webs.
Figure 18:
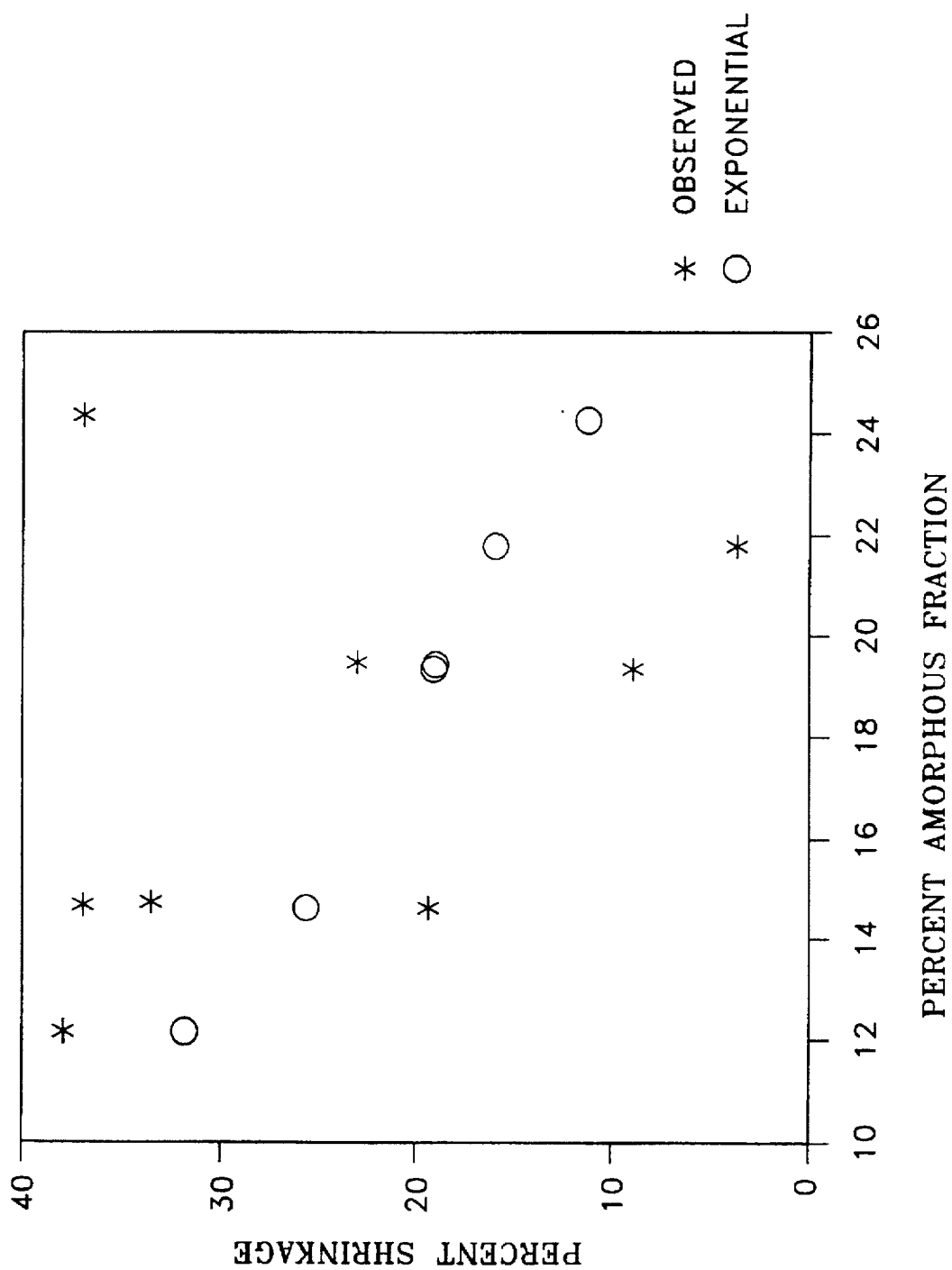
FIG. 18 shows Relationship between shrinkage and amorphous content for PET melt blown webs.
Figure 19:
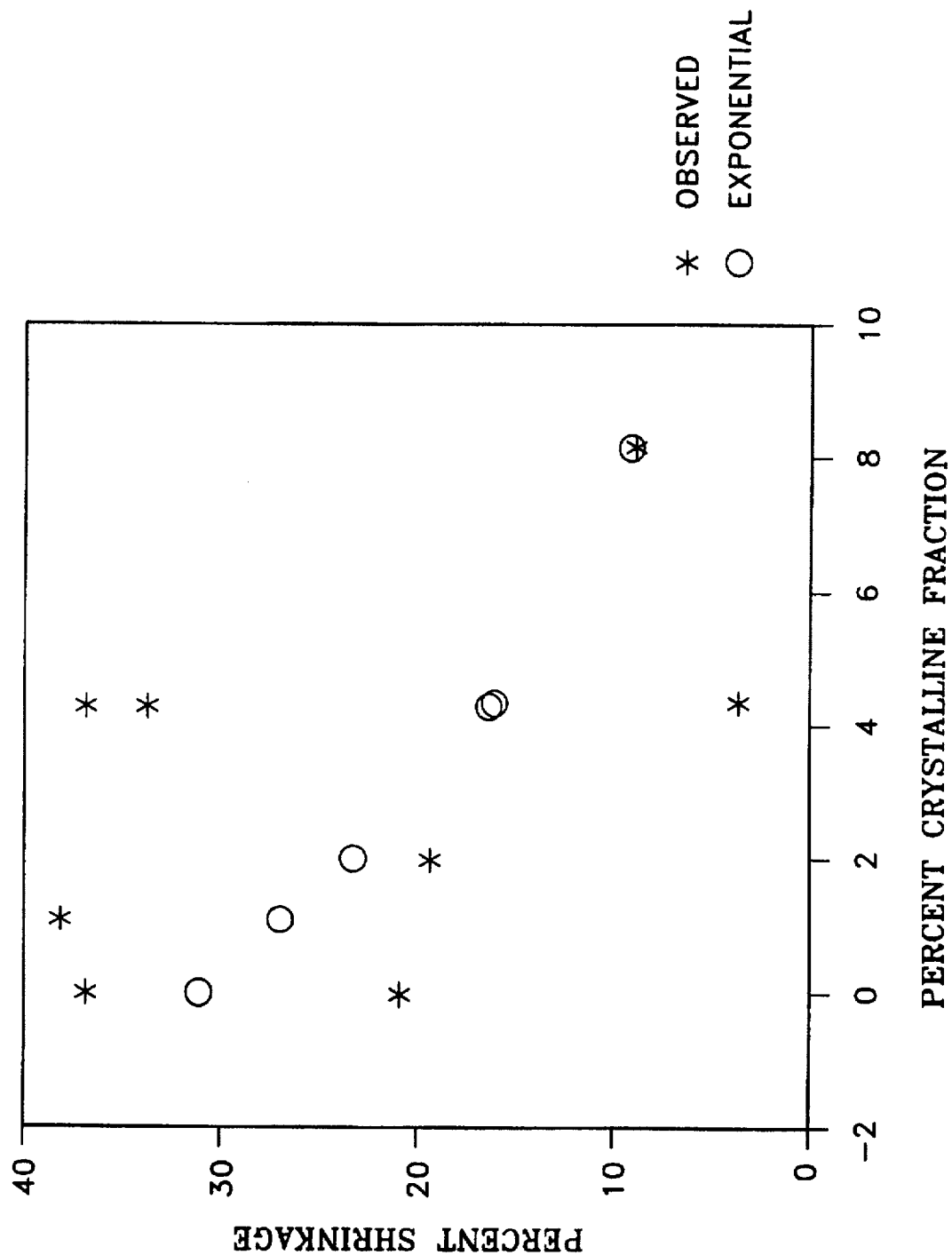
FIG. 19 shows Relationship between shrinkage and crystalline content for PET melt blown webs.

A statistical correlation between percent shrinkage at 110° C. versus crystalline, amorphous and rigid amorphous contents of the fiber was obtained as shown in Table 11. Although the data points were limited, a clear trend was observed between percent shrinkage values and different entities present in the fiber structure. Shrinkage was found to be negatively correlated with the amount of crystalline and amorphous fractions present in the fiber. The rigid amorphous fraction was positively correlated with shrinkage indicating that an increase in rigid amorphous content would result in an increase of thermal shrinkage of the melt blown PET webs. This result was found to be significant at the 90% confidence level. Rigid amorphous content also had higher correlation values with shrinkage compared to crystalline and amorphous fractions. Several statistical models were analyzed for the observed data points and the one with significant F-value, in this case an exponential model was chosen as shown in Table 12. The observed trends were also plotted along with the predicted model in FIGS. 17–19.

Figure 20:
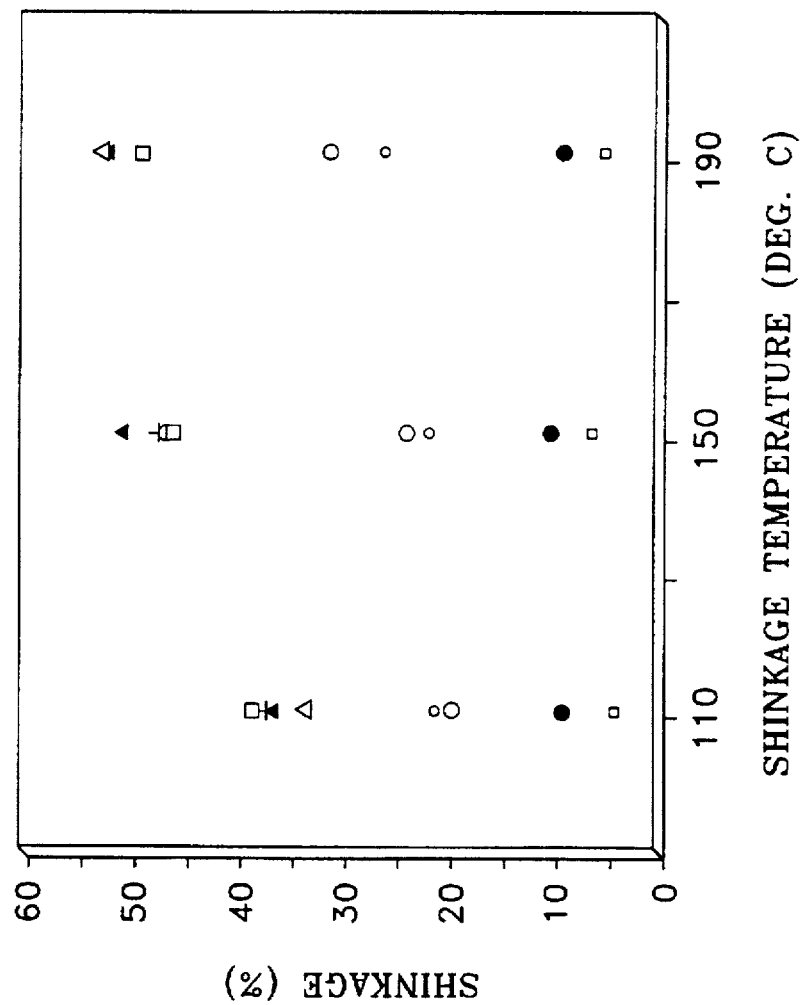
FIG. 20 shows Shrinkage behavior of PET melt blown fibers product under different process conditions.

Shrinkage studies were also performed at 150° and 190° C. The results are shown in FIG. 20. Three sets of samples are shown to have similar percent shrinkage values. The presence of crystallites in the as-produced fibers has considerable influence on the percent shrinkage values of fibers.

Figure 21:
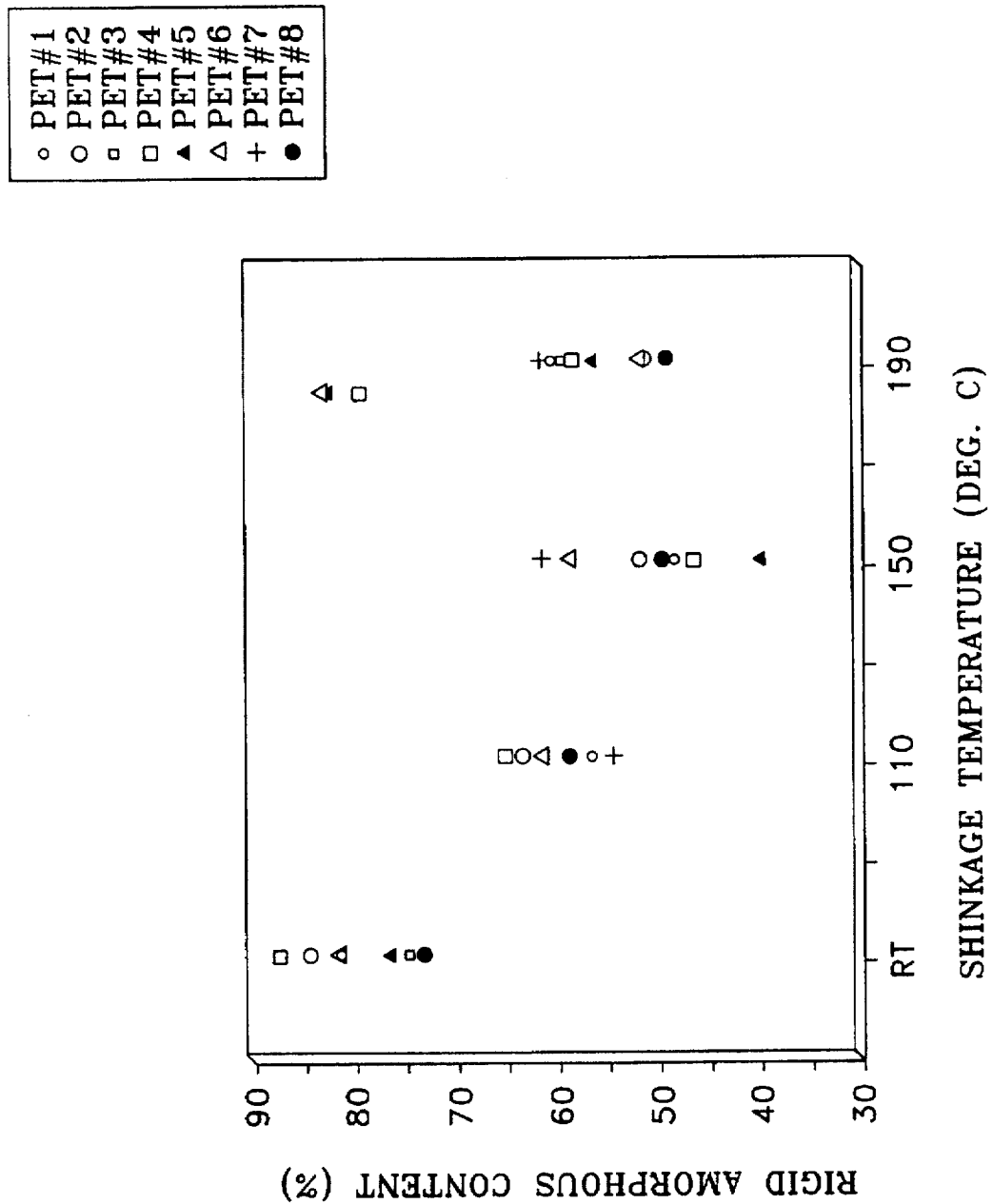
FIG. 21 shows The effect of temperature on the percent rigid amorphous content of melt blown PET fibers with no additives.
Figure 22:
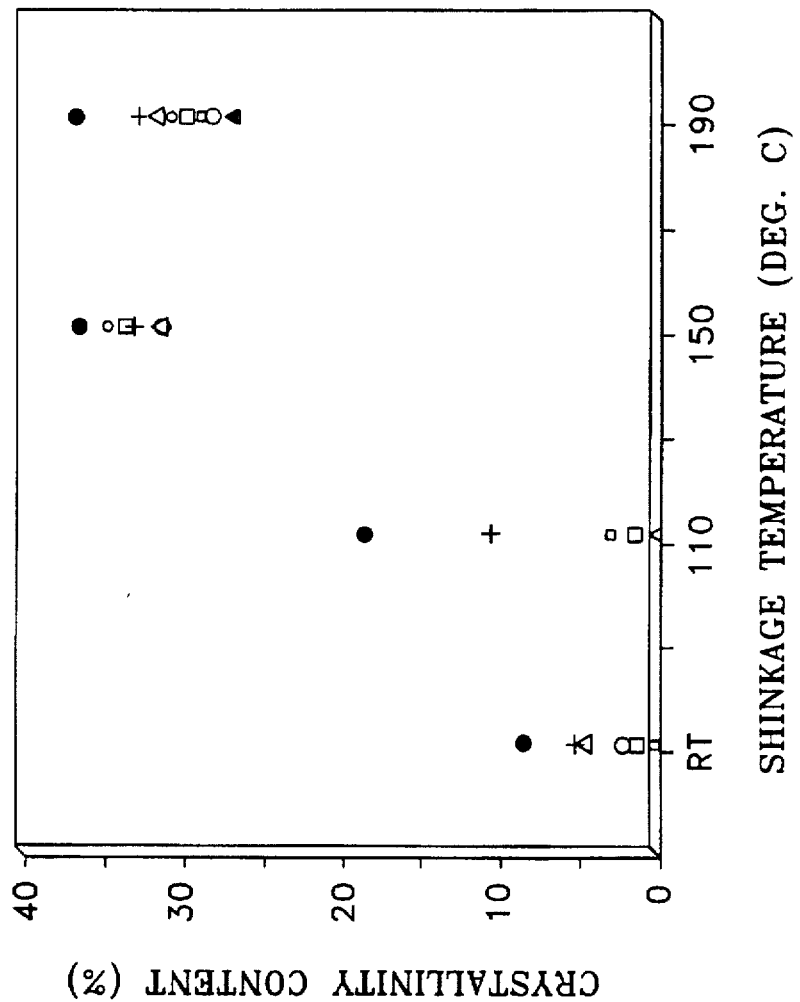
FIG. 22 shows The effect of temperature on the crystallinity of PET melt blown webs with no additives.
Figure 23:
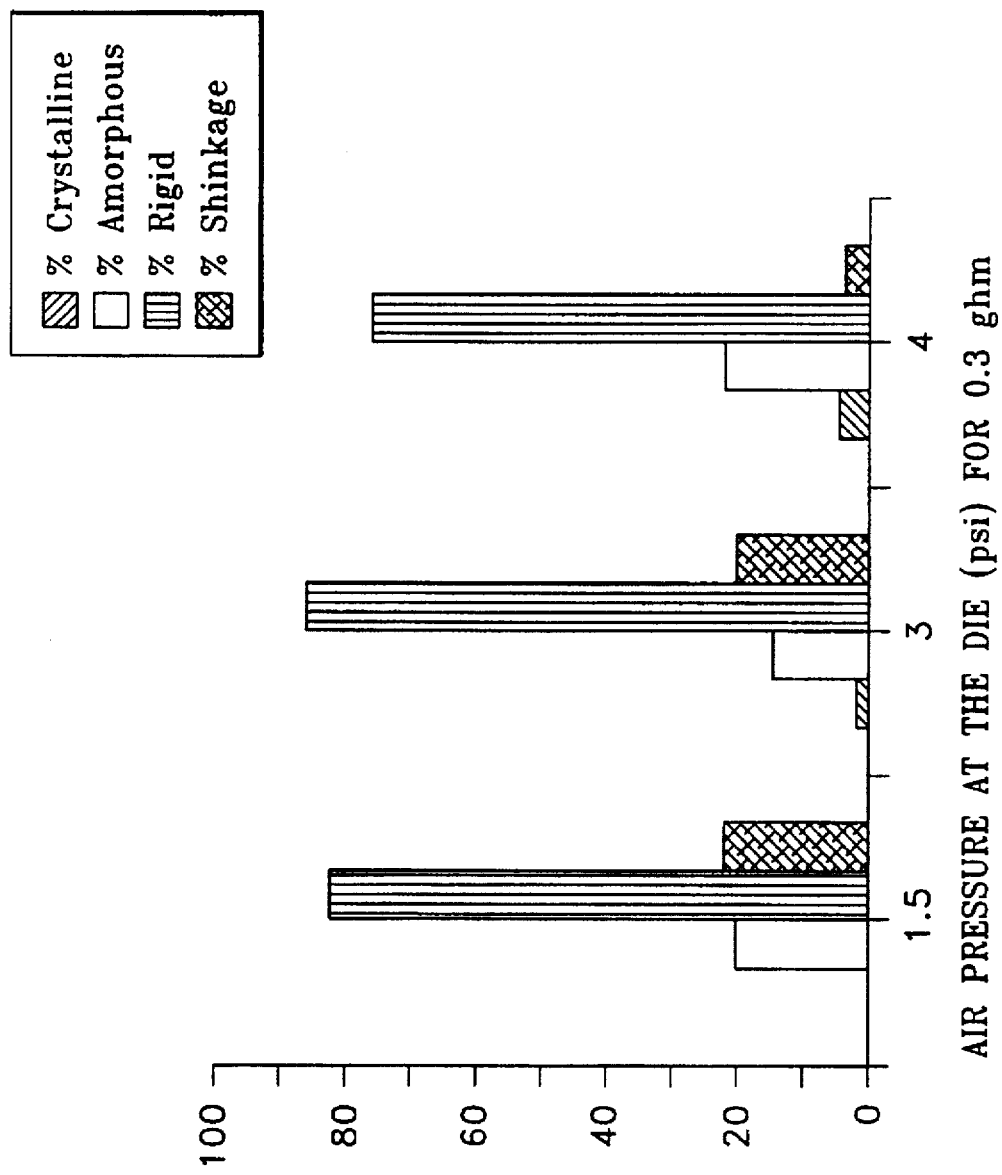
FIG. 23 shows The effect of air pressure at the die on the shrinkage of PET melt blown webs.
Figure 24:
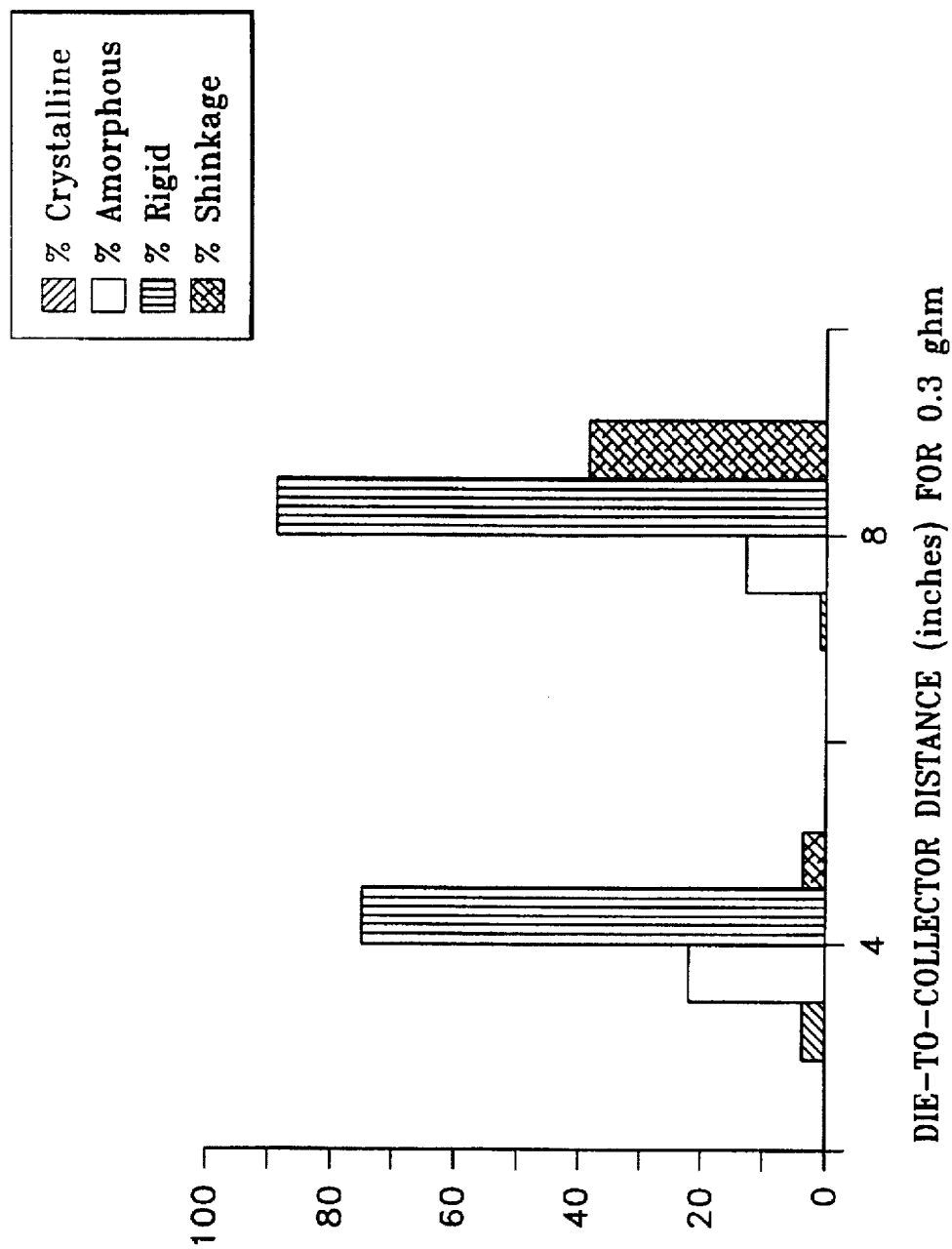
FIG. 24 shows The effect of cooling length on the shrinkage of PET melt blown webs.
Figure 25:
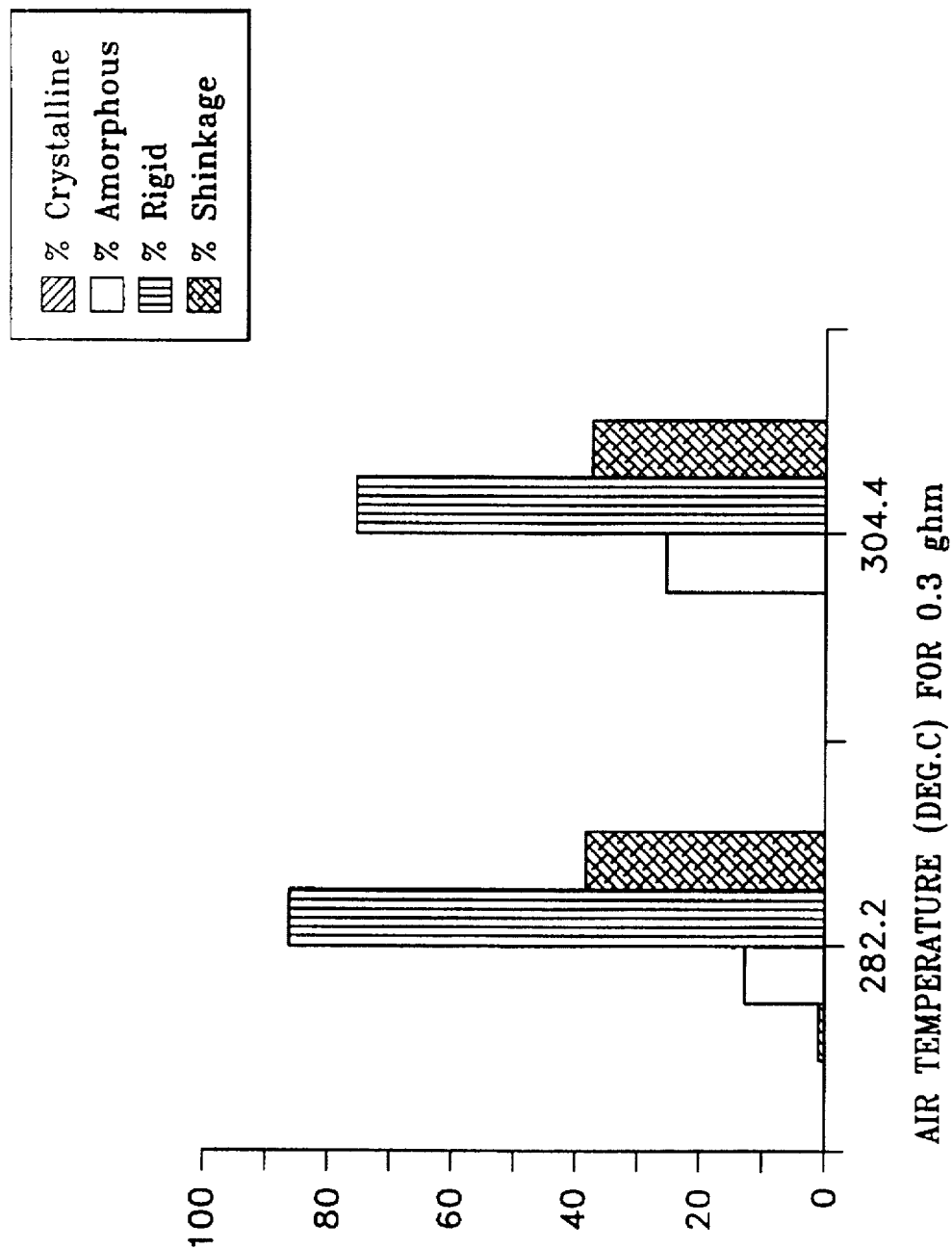
FIG. 25 shows The effect of air temperature on the shrinkage of PET melt blown webs.
Figure 26:
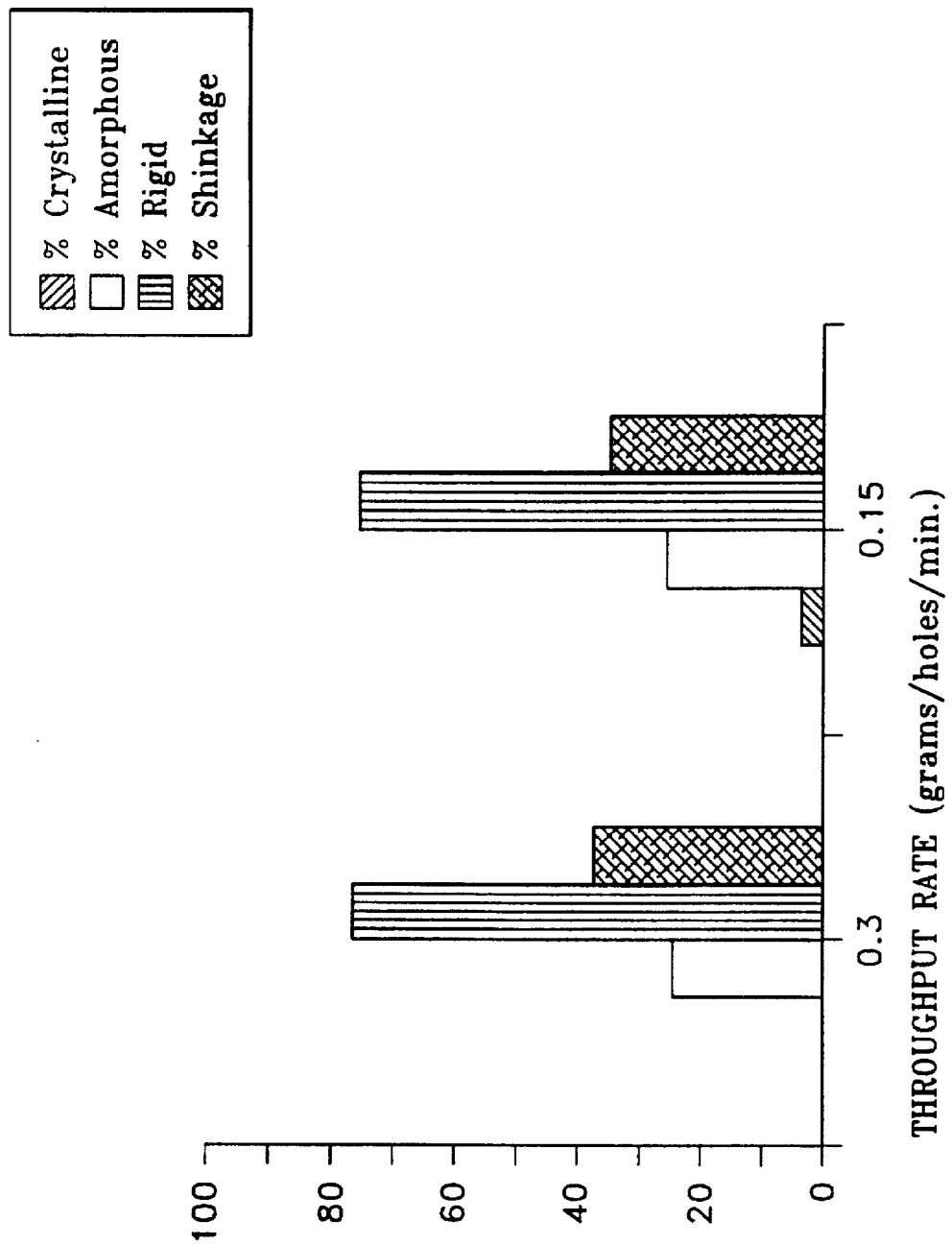
FIG. 26 shows The effect of throughput rate on the shrinkage of PET melt blown webs.

The shrinkage was found to increase with shrinkage temperature in the case of fibers that had no detectable crystallinity. The shrinkage values remained the same in the case of fibers that had crystallites in the as-produced material. The rigid amorphous content was found to decrease on annealing as shown in FIG. 21. The reason being the participation of oriented amorphous molecules in shrinkage and disorientation at 110° C. and 190° C. At 150° C., the lowest values for the rigid amorphous content was observed. Participation of rigid amorphous material in the crystallization process is the reason for this reduction in the rigid amorphous content. At 150° C., the fibers undergo competing mechanisms of shrinkage and crystallization. The change in the rigid amorphous content is also determined by the initial status of the material such as the relative portions of the crystalline and rigid amorphous segments. Thus the trend observed is similar to the one observed in the case of PET fibers with nucleating additives. No appreciable crystallinity was detected in the case of essentially amorphous fibers annealed at 110° C. for 3 minutes. However, the crystallinity was found to rapidly increase at 150° C., the Tch being 129° C. or so and remained almost at the same value at 190° C. as shown in FIG. 22. Here again, the value of final percent crystallinity was dependent on the initial status of the material such as the presence of detectable crystallites/nuclei present in the fiber.

The mean, standard deviation and CV % of fiber diameters for PET melt blown fibers produced with nucleating additives are shown in Table 13. Mechanical and physical properties of melt blown webs with additives are shown in Tables 14 and 15. It was not possible to keep a constant basis weight and thickness of the samples because of the poor drawing action when LCP was blended with PET. However, loftier webs were produced in the case of blends. Webs that contained LCP had higher air permeability values because of larger fiber diameters. It is very evident that the lower fiber diameters is the reason for lower air permeability values and thus higher filtration efficiency of the PET melt blown webs that contained sodium benzoate. Bursting strength was observed to be lower in the case of webs that contained the additives.

Figure 27:
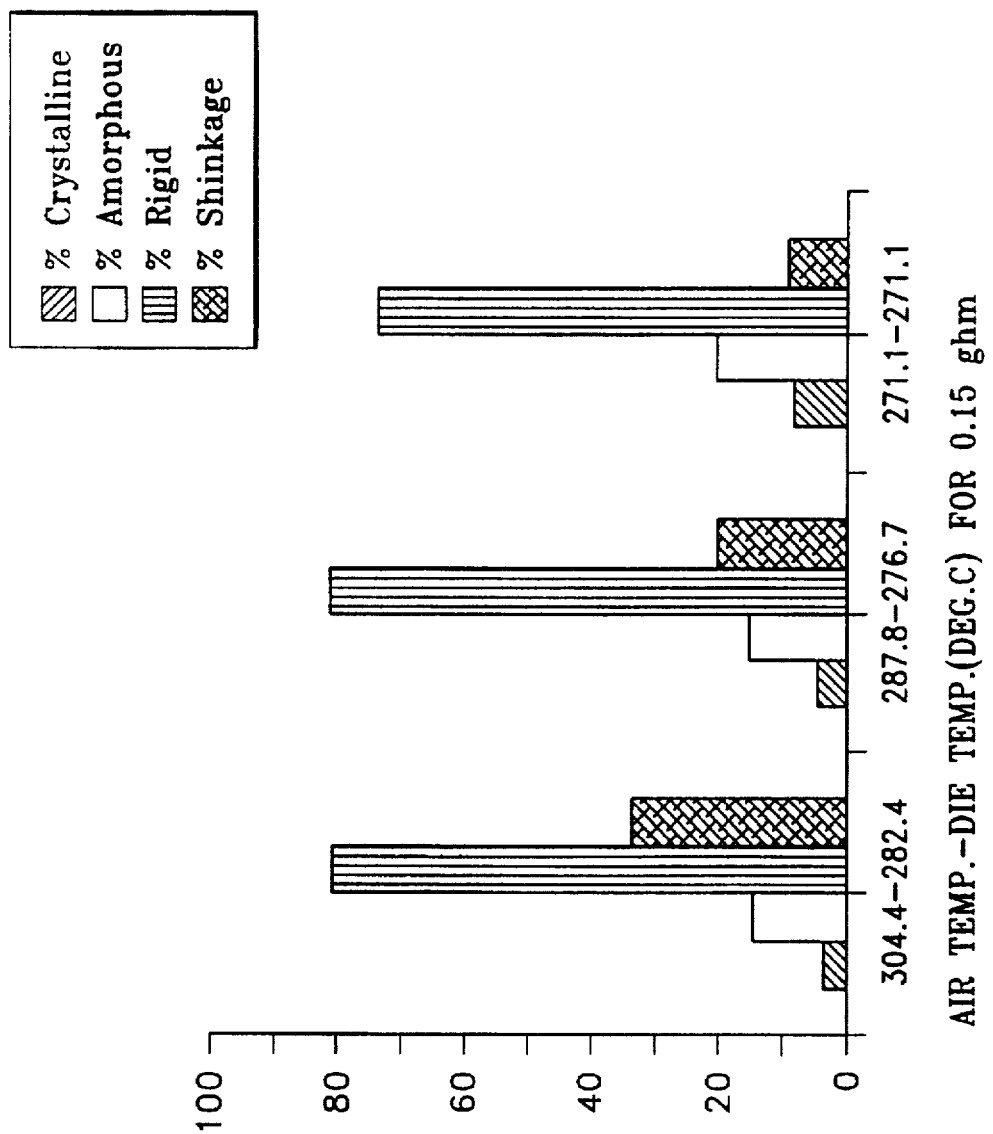
FIG. 27 shows The effect of air-die temperature difference on the shrinkage of PET melt blown webs.

PET Melt Blown webs produced under different processing conditions with no additives In order to investigate the mechanism of shrinkage, PET samples were melt blown varying the process conditions such as the throughput rate, die-to-collector distance, air pressure at the die, air temperature and die temperature. The results from the as-produced fibers are shown in Tables 16 and 17 and also in FIGS. 23–27. An ice cooled amorphous PET film was taken as the reference material. The effect of orientation during melt blowing could be seen from the increase in the $T_g$ and the rigid amorphous content of the processed fibers. There was no appreciable difference in the $T_{ch}$ and $T_m$ values of the webs produced under different conditions. The crystalline fraction was found to slightly increase on increasing the air pressure at the die. This also resulted in a slight decrease in the rigid amorphous content. Interestingly, the shrinkage values were found to be much lower in the case of melt blown webs produced at 4 psi air pressure at a throughput rate of 0.3 ghm. Thus it can be seen that dimensional stability of webs could also be improved by processing PET at suitable conditions without any nucleating additive. Increasing the cooling distance, i.e. the die-to-collector distance resulted in a decrease in crystallinity and an increase in the rigid amorphous content. The shrinkage value was found to be close to 40%. An increase of about 20° C. in air temperature was not influential in reducing the shrinkage values. Although there was a reduction in rigid amorphous content, no on-line thermal crystallization or annealing was found to occur. The web crystallinity was found to increase slightly on reducing the throughput rate to 0.15 ghm from 0.3 ghm. However, only a slight reduction in shrinkage was observed. The slight increase in crystalline and rigid amorphous fraction at low throughput rate could be due to the increase in elongation rate due to reduction in velocity of polymer at the die tip for the same air pressure. It is not clear whether this would result in any on-line stress induced crystallization. The ideal condition for processing PET of 0.9 I. V. could be the last segment as shown in FIG. 27. The crystallinity was found to increase with reduction in rigid amorphous fraction and a simultaneous decrease in shrinkage on processing the polymer at equal die and air temperatures, in this case, 271° C.

The effect of changing different processing variables on the mechanical properties of the melt blown PET webs is shown in Table 18. It is evident that an increase in strength was obtained by increasing the air pressure at the die for the same throughput rate [PET#1 to PET#3]. This is due to the orientation of the molecular chains and finer fibers. Finer the fibers, there are more number of fibers in a given cross section of the webs. This results in improved tenacity values. A slight increase in elongation and breaking energy indicates that the webs become tougher on increasing the air flow rate for the same throughput rate. A slight decrease in modulus was observed in the case of PET#3. An increase in cooling length or collection distance would reduce the thermal sticking or bonding between the fibers in the melt blown web. Similar results were obtained on increasing the air temperature. Although, the values of initial modulus were comparable, the webs became tougher as indicated by the higher breaking elongation and breaking energy values. The breaking tenacity showed a maximum for lower throughput rate samples. Almost all the samples produced had ductile failure except PET#8. The failure behavior of PET#8 webs was observed to be laminar type. There was very minimal thermal sticking between fibers that resulted in poor elongation and breaking energy values. Although, PET#8 is the ideal fabric for its improved thermal properties, it had poor mechanical properties. These samples also had much higher coefficient of variation when compared to the rest of the webs produced.

The mean, standard deviation and CV % of fiber diameters for PET melt blown fibers produced without nucleating additives is shown in Table 19. The physical properties of PET melt blown webs produced under different processing conditions without any type of additive are shown in Table 20. An increase in the air pressure at the die was found to decrease the basis weight and thickness of webs. Decrease in fiber diameter caused also a reduction in the air permeability and an increase in filtration efficiency. Bursting strength increased with an increase in air pressure at the die. The basis weight and thickness were found to increase on increasing the cooling length or collection distance. The air permeability increased and the bursting strength decreased. Similar results were obtained on increasing the air temperature for the same throughput rate, die to collector distance and air pressure at the die. A decrease in fiber diameter at lower throughput rate is manifested as a decrease in basis weight, thickness and air permeability when compared to webs produced at a higher throughput rate except in the case of PET#8. The web construction of PET#8 is quite different from webs produced at the same throughput rate. The webs were loftier and permeable with very soft hand and high bursting strength.

The references listed hereunder form part of the disclosure of this specification and are herein incorporated expressly by reference.

The methods and products of the invention are exemplified herein by use of PET and of the illustrated nucleating additives. These exemplified methods and products are for illustration purposes only. The methods of the invention can be practiced using other suitable polyesters, such as homologues and co-polymers of PET, including poly(propylene), poly(ethylene), poly(amide), poly(butylene terephthalate) and poly(isopropyl terephthalate), and other suitable nucleating agents, as determined by a suitable screening test, such as the test described herein.

TABLE 1

Material, Structure, Trade Name and Source

| Material | Chemical Repeat Unit | Trade Name | Source |
|---|---|---|---|
| PET | +OC—⌬—CO(CH$_2$)$_2$O+$_n$ | SSP | Hoechst Celanese |
| LCP | +O—⌬—C(O)+$_n$+O—⌬⌬—C(O)+$_n$ | VECTRA | Hoechst Celanese |
| Ionomer | +(CH$_2$—CH$_2$)$_n$+CH$_2$—C(CH$_3$)(COO$^-$M$^+$)+$_{1/2n}$ | SURLYN | DuPont |
| Sodium Benzoate | ⌬—CONa | — | Aldrich Chemicals |
| Copper Sulfate Pentahydrate | CuSO$_4$·5H$_2$O | — | Aldrich Chemicals |

TABLE 2

Injection Molding Conditions

| Machine Type | ARBURG Model No: 221-55-250 |
|---|---|
| Die Temperature | 300° C. |
| Mold Temperature | 25° C. |
| Screw Speed | 200 rpm |

TABLE 3

Compounding Conditions

| Machine Type | LEISTRITZ Twin Screw Extruder with co-rotating screws (34 mm diameter) |
|---|---|
| Pelletizer | KILLION |
| Die Temperature | 215° C. |
| Screw Speed | 200 rpm |
| Head Pressure | 600 to 700 psi |
| Cooling Distance | 4 to 5" in water |

TABLE 4

Melt blowing conditions for PET with nucleating additives

Samples Produced:

(1) PET
(2) PET + 10% LCP
(3) PET + 1% Sodium Benzoate
(4) PET + 10% LCP + 1% Sodium Benzoate TABLE 4-continued Melt blowing conditions for PET with nucleating additives (5) PET + 10% LCP + 1% Ionomer Conditions:

| Throughput Rate | 0.4 grams/hole/min. |
|---|---|
| Die-to-Collector Distance | 9 inches |
| Air Pressure | 3 psi |
| Die Temperature | 274° C. |
| Air Temperature | 264° C. |

TABLE 5

Melt blowing conditions for PET webs without any additives produced under different process conditions

| Sample ID | Throughput Rate (ghm) | Die-to-Collector Distance (inches) | Air Pressure at the die (psi) | Air Temperature (°C.) | Die Temperature (°C.) |
|---|---|---|---|---|---|
| PET #1 | 0.3 | 4 | 1.5 | 282 | 282 |
| PET #2 | 0.3 | 4 | 3.0 | 282 | 282 |
| PET #3 | 0.3 | 4 | 4.0 | 282 | 282 |
| PET #4 | 0.3 | 8 | 4.0 | 282 | 282 |
| PET #5 | 0.3 | 8 | 4.0 | 304 | 282 |
| PET #6 | 0.15 | 8 | 4.0 | 304 | 282 |
| PET #7 | 0.15 | 8 | 4.0 | 288 | 276 |
| PET #8 | 0.15 | 8 | 4.0 | 271 | 271 |

TABLE 6

Shrinkage Studies
Oven Type - Scientific Products DK 63
Temperature - 105° C.
Original length - 12.7 cm

| Material | Average Thickness (μ) | Treatment time (min.) |
|---|---|---|
| PET | 211 | 3 |
| PET + 1% Sod. Benzoate | 248 | 3 |
| PET + 10% LCP | 863 | 12 |
| PET + 10% LCP + 1% Sod. Benzoate | 1195 | 17 |
| PET + 10% LCP + 1% Ionomer | 1479 | 21 |

TABLE 7

Crystallization Temperatures of injection molded PET and PET with additives at different cooling rates

| | Cooling Rates | | |
|---|---|---|---|
| Material | 20° C./min. | 40° C./min. | 60° C./min. |
| PET | 208.2 | 144.6 | 69.9 |
| PET + 1% Liquid Crystalline Polyester (LCP) | 207.5 | 139.1 | 57.8 |
| PET + 10% LCP (Trade name - VECTRA) | 203.9 | 145.7 | 57.4 |
| PET + 1% Ionomer (Trade name - SURLYN) | 208.3 | 139.2 | 57.6 |
| PET + 10% Ionomer | 207.2 | 137.8 | 59.9 |
| PET + 2% Sodium Benzoate | 224.7 | 171.8 | 99.2 |
| PET + 2% Copper Sulfate Pentahydrate (Cu S) | 206.3 | 147.7 | 58.2 |
| PET + 1% LCP + 2% Sodium Benzoate | 223.7 | 171.9 | 109.4 |
| PET + 10% LCP + 1% Ionomer | 210.3 | 144.6 | 53.8 |
| PET + 10% LCP + 3% Ionomer | 204.1 | 140.6 | 55.7 |
| PET + 10% LCP + 2% Cu S | 203.4 | 132.4 | 37.6 |
| LCP | 234.0 | 190.5 | 139.3 |

Note: The samples were held at 300° C. for 3 minutes and then cooled at rates of 20, 40 and 60 deg. C./min. The samples were also heated to 300° C. from 50° C. at a rate of 20° C./min.

TABLE 8

Transition Temperatures and Percent Crystallinity of injection molded PET with additives

| | DSC Parameters | | | |
|---|---|---|---|---|
| Material | $T_{ch}$ | $T_m$ | % Crystallinity on heating ($\Delta H_m - \Delta H_{ch}$) | % Crystallinity on cooling ($\Delta H_{cc}$) |
| PET | 129.2 | 257.0 | N.D. | 44.60 |
| PET + 1% Liquid Crystalline Polyester (LCP) | 129.0 | 254.3 | N.D. | 46.66 |
| PET + 10% LCP (Trade name-VECTRA) | 127.7 | 255.9 | 5.86 | 43.37 |
| PET + 1% Ionomer (Trade name-SURLYN) | 127.8 | 255.8 | 2.43 | 45.95 |
| PET + 10% Ionomer | 134.1 | 258.3 | N.D. | 46.76 |
| PET + 2% Sodium Benzoate | 117.4 | 261.2 | 23.74 | 46.82 |
| PET + 2% Copper Sulfate Pentahydrate (Cu S) | 134.8 | 258.1 | 8.21 | 47.16 |
| PET + 1% LCP + 2% Sodium Benzoate | 119.6 | 260.4 | 10.8 | 48.66 |
| PET + 10% LCP + 1% Ionomer | 129.0 | 261.2 | 2.83 | 49.49 |
| PET + 10% LCP + 3% Ionomer | 129.0 | 255.9 | 2.03 | 44.11 |
| PET + 10% LCP + 2% Cu S | 124.3 | 261.2 | 9.02 | 50.47 |
| LCP | --- | ($T_i$) 276–280 | negligible | negligible |

NOTE:
The samples were heated to 300° C. from 50° C. at a rate of 20° C./min.
N.D. - Not Detected
Ti - Temperature of isotropization

TABLE 9

Transition Temperatures and Percent Crystallinity of PET melt blown webs with additives

| | DSC Parameters | | |
|---|---|---|---|
| Material | $T_{ch}$ | $T_m$ | % Crystallinity on heating ($\Delta H_m - \Delta H_{ch}$) |
| PET | 130.4 | 258.6 | N.D. |
| PET + 10% LCP (Trade name-VECTRA) | 124.1 | 256.3 | N.D. |
| PET + 1% Sodium Benzoate | 116.2 | 259.2 | 9.82 |
| PET + 10% LCP + 1% Sodium Benzoate | 120.3 | 258.2 | N.D. |
| PET + 10% LCP + 1% Ionomer | 127.0 | 257.1 | N.D. |

NOTE:
The samples were heated to 300° C. from 50° C. at a rate of 20° C./min.
N. D. means Not Detected

TABLE 10

Tg, Percent Crystalline, Amorphous and Rigid Amorphous Fractions and Shrinkage for PET with nucleating additives

| Material | Tg (°C.) | Percent Crystalline Fraction | Percent Amorphous Fraction | Percent Rigid Amorphous Fraction | Shrinkage (%) |
|---|---|---|---|---|---|
| PET | 80.9 | N.D. | 18.30 | 81.7 | 30.70 |
| PET + 10% LCP | 74.3 | N.D. | 64.74 | 35.25 | 3.31 |
| PET + 1% Sodium Benzoate | 72.2 | 9.82 | 21.31 | 68.87 | 2.68 |
| PET + 10% LCP + 1% Sodium Benzoate | 75.8 | N.D. | 54.75 | 45.24 | 7.09 |
| PET + 10% LCP + 1% Ionomer | 78.3 | N.D. | 31.07 | 68.93 | 2.83 |

TABLE 11

Correlation between shrinkage and different structural entities present in PET melt blown webs produced with no additives (annealing temperature - 110° C.)

| | Correlation Coefficients | | | |
|---|---|---|---|---|
| | SHRINK | CRYST | AMR | RIGID |
| SHRINK | 1.0000 (8) P = . | −.4804 (8) p = .228 | −.4020 (8) p = .323 | .6172 (8) P = .103 |
| CRYST | −.4804 (8) P = .228 | 1.0000 (8) P = . | −.0591 (8) P = .889 | −.5161 (8) P = .190 |
| AMR | −.4020 (8) P = .323 | −.0591 (8) P = .889 | 1.0000 (8) P = . | −.8245 (8) P = .012 |
| RIGID | .6172 (8) P = .103 | −.5161 (8) P = .190 | −.8245 (8) P = .012 | 1.0000 (8) P = . |

(Coefficient/(Cases)/2-tailed Significance)
"." is printed if a coefficient cannot be computed

TABLE 13

Mean, Standard deviation and CV % of fiber diameters for PET melt blown fibers produced with nucleating additives

| Sample ID | Mean (μ) | Standard Deviation (μ) | Coefficient of Variation (%) |
|---|---|---|---|
| PET | 4.3 | 2.4 | 56 |
| PET + 1% SB | 1.6 | 1.4 | 88 |
| PET + 10% LCP | 17.7 | 10.3 | 58 |
| PET + 10% LCP + 1% SB | 6.7 | 6.5 | 97 |
| PET + 10% LCP + 1% Ionomer | 28.0 | 9.8 | 35 |

TABLE 12

Different statistical models and their significance

Independent: RIGID

| Dependent | Mth | Rsq | d.f. | F | Sigf | Upper bound | b0 | b1 | b2 |
|---|---|---|---|---|---|---|---|---|---|
| SHRINK | LIN | .381 | 6 | 3.69 | .103 | | −107.90 | 1.6723 | |
| SHRINK | LOG | .389 | 6 | 3.81 | .099 | | −558.68 | 133.452 | |
| SHRINK | INV | .396 | 6 | 3.94 | .095 | | 159.038 | −10616 | |
| SHRINK | QUA | .434 | 5 | 1.91 | .241 | | −1020.2 | 24.7888 | −.145 |
| SHRINK | CUB | .434 | 5 | 1.91 | .241 | | −1020.2 | 24.7888 | −.145 |
| SHRINK | COM | .445 | 6 | 4.82 | .071 | | .0032 | 1.1166 | |
| SHRINK | POW | .456 | 6 | 5.03 | .066 | | 3.6E-16 | 8.8149 | |
| SHRINK | S | .466 | 6 | 5.23 | .062 | | 11.8722 | −702.18 | |
| SHRINK | GRO | .445 | 6 | 4.82 | .071 | | −5.7574 | .1103 | |
| SHRINK | EXP | .445 | 6 | 4.82 | .071 | | .0032 | .1103 | |
| SHRINK | LGS | .445 | 6 | 4.82 | .071 | . | 316.514 | .8956 | |

TABLE 14

Mechanical properties of PET melt blown webs produced with nucleating additives

| Sample ID | Tenacity (mN/tex) | Breaking Elongation (%) | Initial Modulus (N/tex) | Breaking Energy (Kg – m) |
|---|---|---|---|---|
| PET | 16.2 | 42.0 | 0.68 | 0.097 |
| PET + 1% SB | 16.2 | 3.4 | 0.73 | 0.003 |
| PET + 10% LCP | 2.0 | 4.8 | 0.18 | 0.001 |
| PET + 10% LCP + 1% SB | 2.1 | 5.1 | 0.10 | 0.003 |
| PET + 10% LCP + 1% Ionomer | 0.5 | 14.9 | 0.05 | 0.001 |

TABLE 15

Physical properties of PET melt blown webs with nucleating additives

| Sample | Basis Weight (GSM) | Thickness (μ) | Air Permeability (m³/m²/sec) | Bursting Strength (KPa) | Bending Rigidity (mg – cm) | Theoretical Filtration Efficiency (%) |
|---|---|---|---|---|---|---|
| PET | 45.27 | 211 | 0.38 | 35.94 | | |
| PET + 1% SB | 23.16 | 248 | 0.29 | 11.06 | | |
| PET + 10% LCP | 43.14 | 863 | 5.84 | 8.99 | | |
| PET + 10% LCP + 1% SB | 137.62 | 1195 | 1.29 | 6.91 | | |
| PET + 10% LCP + 1% IO | 105.95 | 1479 | 4.19 | 13.13 | | |

TABLE 16

Transition temperatures and percent crystallinity values of PET melt blown webs produced under different processing conditions

| Material | $T_{ch}$ | $T_m$ | % Crystallinity on heating ($\Delta H_m - \Delta H_{ch}$) |
|---|---|---|---|
| PET (ice cooled amorphous film) | 133.5 | 258.1 | N.D. |
| PET #1 | 130.5 | 254.2 | N.D. |
| PET #2 | 129.4 | 254.1 | 1.95 |
| PET #3 | 129.3 | 254.1 | 4.43 |
| PET #4 | 130.3 | 255.1 | 1.00 |
| PET #5 | 132.5 | 254.1 | N.D. |
| PET #6 | 132.5 | 255.3 | 4.35 |
| PET #7 | 135.3 | 254.2 | 4.42 |
| PET #8 | 131.1 | 255.4 | 8.13 |

NOTE:
The samples were heated to 300° C. from 50° C. at a rate of 20° C./min.
N.D. means Not Detected

TABLE 17

Glass transition temperatures and amount of different structural entities present in as-produced PET melt blown webs produced with no additives

| Sample ID | Tg (°C.) | Percent Crystalline Fraction | Percent Amorphous Fraction | Percent Rigid Amorphous Fraction | Shrinkage (%) |
|---|---|---|---|---|---|
| PET FILM | 81.4 | N.D. | 70.79 | 29.21 | — |
| PET #1 | 83.5 | N.D. | 19.47 | 80.53 | 20.94 |
| PET #2 | 83.4 | 1.95 | 14.61 | 83.44 | 19.37 |
| PET #3 | 84.1 | 4.43 | 21.86 | 73.71 | 3.94 |
| PET #4 | 83.8 | 1.00 | 12.16 | 86.84 | 37.95 |
| PET #5 | 83.3 | N.D. | 24.35 | 75.65 | 36.69 |
| PET #6 | 82.5 | 4.35 | 14.64 | 81.01 | 33.39 |
| PET #7 | 83.8 | 4.42 | 14.59 | 80.99 | 36.85 |
| PET #8 | 85.3 | 8.13 | 19.37 | 72.50 | 8.98 |

TABLE 18

Mechanical properties of PET melt blown webs produced with nucleating additives

| Sample ID | Tenacity (mN/tex) | Breaking Elongation (%) | Initial Modulus (N/tex) | Breaking Energy (Kg – m) |
|---|---|---|---|---|
| PET #1 | 11.0 | 27.3 | 0.55 | 0.028 |
| PET #2 | 14.7 | 27.2 | 0.64 | 0.032 |
| PET #3 | 19.7 | 30.9 | 0.44 | 0.050 |

TABLE 18-continued

Mechanical properties of PET melt blown webs produced with nucleating additives

| Sample ID | Tenacity (mN/tex) | Breaking Elongation (%) | Initial Modulus (N/tex) | Breaking Energy (Kg - m) |
|---|---|---|---|---|
| PET #4 | 14.0 | 78.3 | 0.52 | 0.102 |
| PET #5 | 13.9 | 112.0 | 0.46 | 0.133 |
| PET #6 | 20.0 | 57.4 | 0.57 | 0.062 |
| PET #7 | 20.8 | 36.5 | 0.64 | 0.032 |
| PET #8 | 11.0 | 9.0 | 0.67 | 0.002 |

TABLE 19

Mean, Standard deviation and CV % of fiber diameters for PET melt blown fibers produced without nucleating additives

| Sample ID | Mean (μ) | Standard Deviation (μ) | Coefficient of Variation (%) |
|---|---|---|---|
| PET #1 | 19.4 | 9.8 | 50 |
| PET #2 | 6.6 | 2.4 | 36 |
| PET #3 | 4.7 | 1.8 | 38 |
| PET #4 | 6.7 | 3.0 | 45 |
| PET #5 | 7.7 | 3.6 | 57 |
| PET #6 | 4.4 | 2.4 | 54 |
| PET #7 | 3.2 | 1.5 | 36 |
| PET #8 | 4.4 | 1.7 | 38 |

TABLE 20

Physical properties of PET melt blown webs with no additives

| Sample | Basis Weight (GSM) | Thickness (μ) | Air Permeability (m³/m²/sec) | Bursting Strength (KPa) | Bending Rigidity (mg - cm) | Theoretical Filtration Efficiency (%) |
|---|---|---|---|---|---|---|
| PET #1 | 32.50 | 383 | 3.85 | 20.73 | | |
| PET #2 | 26.38 | 199 | 1.36 | 21.43 | | |
| PET #3 | 29.08 | 156 | 0.59 | 31.80 | | |
| PET #4 | 32.47 | 263 | 0.97 | 21.43 | | |
| PET #5 | 29.31 | 238 | 1.18 | 20.73 | | |
| PET #6 | 19.19 | 191 | 0.85 | 15.89 | | |
| PET #7 | 15.93 | 199 | 0.77 | 17.28 | | |
| PET #8 | 19.39 | 227 | 2.05 | 35.94 | | |

Bibliography

1. Malkan, S. R. and Wadsworth, L. C., *International Textiles Bulletin: Nonwovens*, 37, 2, 46–52 (1991)
2. Malkan, S. R. and Wadsworth, L. C., *International Textiles Bulletin: Nonwovens*, 37, 3, 22–28 (1991)
3. Buntin, R. R. and Lohkamp, D. T., TAPPI, 56, 4, 74–77 (1973)
4. Davey, C. R., *Book of papers, INDATEC 1987*, Hilton Head, S.C., 232–237, May 18–21 (1987)
5. Davey, C. R., *Nonwovens: An Advanced Tutorial*, Ed., A. F. Turbak and T. L. Vigo, TAPPI press, Atlanta, Ga., 159–172 (1989)
6. Malkan, S. R., and Wadsworth, L. C., *INDA JNR.*, vol. 3, no. 2, 21–34 (1991)
7. Malkan, S. R., and Wadsworth, L. C., *INDA JNR.*, vol. 3, no. 3, 21–29 (1991)
8. Haynes, B. and Milligan, M., *INDA JNR.*, vol. 3, no. 4, 20–25 (1991)
9. Wadsworth, L. C. et al., *Book of papers, TAPPI Nonwovens Conference*, Macro Island, Fla., 1–7, May 4–11, 1990
10. Dever, M., Wadsworth, L. C. and Lee, Y., *INDA JNR.*, vol. 3, no. 1, 19–24 (1991)
11. Zhang, Y., M. S. Thesis, The University of Tennessee, Knoxville (1991)
12. Bhat, G. S., Zhang, Y., and Wadsworth, L. C., *Proceedings of the TAPPI Nonwovens Conference*, Macro Island, Fla., 61–68, May 1992
13. Vasanthakumar, N., Bhat, G. S., Wadsworth, L. C., and Joy, D., *International Nonwovens Journal*, vol. 6, no. 1, 42–46 (1994)
14. Bhat, G. S., Vasanthakumar, N., Nityananda, R. and Wadsworth, L. C., *Proceedings of 22nd NATAS Conference*, 96–101 (1993)
15. Concise Encyclopedia of Polymer Science and Engineering edited by Kroschwitz, J. I., 229–235 (1990)
16. Armistead, K. and Goldberg-Wood, G., *Advances in polym. sci.*, vol. 100, 219–311 (1992)
17. Winter school notes IIT Delhi, 1990 (private communication)
18. Frank, F. C., *Disc Faraday Soc.*, 25:205 (1958)
19. Hoffman, J. D., *polymer* 24:3 (1983)
20. Sadler, D. M., Harris, R., *J. polym. sci., polym. phys. edn.*, 20;561 (1982)
21. Spells, S. J., Keller, A. and Sadler, D. M., *polymer* 25:749 (1984)
22. Cheng, S. D. "Macromolecules" in *Polymer Analysis and Characterization* by Barth, H. G. (1988)
23. Cobbs, W. H. and Burton, R. L., *J. Polym. Sci.*, vol. 10, no. 3, 275–290 (1953)
24. Volmer, M., *Kintik derphasenbildung*, Steinkopff, Dresden (1939)
25. Becker, R. and Doring, W., *Ann. physik*, 24, 719 (1935)
26. Fischer, J. C., Hollomon, J. H. and Turnbull, D., *J. Applied phys.*, 19, 775–84 (1948)
27. Van Antwerpen, F. and Van Krevelen, D. W., *J. Polym. Sci.*, vol. 10, 2423–2435 (1972)
28. Jabarin, S. A., *Polym. Engg. & Sci.*, vol. 29, no. 18, 1259–1264 (1989)
29. Jabarin, S. A., *J. Appl. Polym. Sci.*, vol. 34, 85–96 (1987)
30. Jabarin, S. A., *J. Appl. Polym. Sci.*, vol. 34, 97–102 (1987)
31. Jabarin, S. A., *J. Appl. Polym. Sci.*, vol. 34, 103–108 (1987)
32. Lin, C. C., *Polym. Engg. & Sci.*, vol. 23, no. 3 (1983)
33. Douillard, A., et al. *Polymer*, vol. 34, no. 8 (1993)
34. Kim, S. P., et al., *Polym. Engg. & Sci.*, vol. 31, no. 2, 110–115 (1991)
35. Aharoni, S. M., *J. Appl. polym. sci.*, vol. 29, 853–865 (1984)

36. Turturro, G., Brown, G. R., and St. Pierre, L. E., *polymer*, 25, 659 (1984)
37. Gumther, B., and Zachmann, H. G., *polymer*, vol. 24, 1008–1014 (1983)
38. Legras, R., Bailly, C., Daumerie, M., Dekoninck, J. M., Mercier, J. P., Zichy, V., and Nield, E., *polymer*, vol. 25, 835–844 (1984)
39. Lawton, E. L., *polym. engg. & sci.*, vol. 25, no. 6, 348–354 (1985)
40. Joseph, E. G., Wilkes, G. L., and Baird, D. G., *polym. prep. Am. chem. soc. div. polym. chem.*, 24, 304 (1983)
41. Bhattacharya, S. K., Tendolkar, A., and Misra, A., *mol. cryst. liq. cryst.*, vol. 153, 501–513 (1987)
42. Sharma, S. K., Tendolkar, A., and Misra, A., *mol. cryst. liq. cryst.*, vol. 157, 597–614 (1988)
43. Bourland, L., *plastics engg.*, 39–41, July 1987
44. Barrett, L. W., Sperling, L. H., Gilmer, J., and Mylonakis, G., *J. Appl. polym. sci.*, vol. 48, 1035–1050 (1993)
45. Barrett, L. W., and Sperling, L. H., *polym. engg. & sci.*, vol. 33, no. 14, 913–922 (1993)
46. Peterlin, A., *polym. engg. & sci.*, vol. 16, no. 3, 126–137 (1976)
47. Yeh, G. S. Y., *polym. engg. & sci.*, vol. 16, no. 3, 138–144 (1976)
48. Yeh, G. S. Y., *polym. engg. & sci.*, vol. 16, no. 3, 145–151 (1976)
49. Keller, A., and Machin, M. J., *J. macromol. sci. (phys.)*, B1, 41 (1967)
50. Spruiell, J. E., McCord, D. E., and Beuerlein, R. A., *Trans. of the soc. of rheology*, 16:3, 535–555 (1972)
51. Heffelfinger, C. J., and Schmidt, P. G., *J. appl. polym. sci.*, vol. 9, 2661–2680 (1965)
52. Misra, A., and Stein, R. S., *J. polym. sci., polym. phys. edn.*, vol. 17, 235–257 (1979)
53. Matsuo, M., Tamada, M., Terada, T., Sawatari, C., and Niwa, M., *Macromolecules*, 15, 988–998 (1982)
54. Terada, T., Sawatari, C., Chigono, T., and Matsuo, M., *Macromolecules*, 15, 988–1004 (1982)
55. Gupta, V. B., Ramesh, C., and Seisler, H. W., *J. polym. sci., polym. phys. edn.*, vol. 23, 405–411 (1985)
56. Van Den Heuvel, C. J. M., Heuvel, H. M., Fassen, W. A., Veurink, J. and Lucas, L. J., *J. appl. polym. sci.*, vol. 49, 925–934 (1993)
57. Heuvel, H. M., and Huisman, R., *J. appl. polym. sci.*, vol. 22, 2229–2243 (1978)
58. Gupta, R. K., and Auyeung, K. F., *J. appl. polym. sci.*, vol. 34, 2469–2484 (1987)
59. Garg, S. K., *J. appl. polym. sci.*, vol. 29, 2111–2116 (1984)
60. Gupta, R. K., and Auyeung, K. F., *polym. engg. & sci.*, vol. 29, no. 16, 1147–1156 (1989)
61. Smith, F. S., and Steward, R. D., *polymer*, vol. 15, 283–286 (1974)
62. Wilson, M. P. W., *polymer*, vol. 15, 277–282 (1974)
63. Mascia, L. and Fekkai, Z., *polymer*, vol. 34, no. 7 (1993)
64. Williams, D. J., *Advances in Polymer Technology*, vol. 10, no. 3, 173–184 (1990)
65. Dutta, D., Fruitwala, H., Kohli, A., and Weiss, R. A., *polym. engg. & sci.*, vol. 30, no. 17, 1005–1018 (1990)
66. Kamal, M. R., Khennache, O., and Goyal, S. K., *polym. engg. & sci.*, vol. 29, no. 16, 1089–1096 (1989)
67. Lenz, R. W., Rao, A. K., Reddy, C. R., Bafna, S., and Bhattacharya, S., *J. polym. sci.*, part B, *polym. phys.* vol. 27, 2117–2130 (1989)
68. Perkins, W. G., Marcelli, A. M., and Frerking, Jr., H. W., *J. appl. polym. sci.*, vol. 43, 329–349 (1991)
69. Sukhadia, A. M., Done, D., and Baird, D. G., *polym. engg. & sci*, vol. 30, no. 9, 519–526 (1990)
70. Kyotani, M., Kaito, A., and Nakayama, K., *Sen—I Gakkaishi*, vol. 47, no. 8, 403–406 (1991)
71. Mithal, A. K., and Tayebi, A., *polym. engg. & sci.*, vol. 31, no. 21, 1533–1538 (1991)
72. Mehta, S., and Deopura, B. L., *polym. engg. & sci.*, vol. 33, no. 14, 931–936 (1993)
73. Lee, W. C., Dibenedetto, A. T., Gromek, J. M., Nobile, M. R., and Acierno, D., *polym. engg. & sci.*, vol. 33, no. 3, 156–165 (1993)
74. Daubney, R. P., Bunn, C. W. and Brown, C. J., Proc. Royal Soc. London, 226A, 531 (1954)
75. Ward, I. M., *Textile Research Journal*, 650–664, July 1961
76. Fischer, E. W. and Fakirov, S., *J. Mater. Sci.*, 11, 1041–1065 (1976)
77. Fu, Y., Busing, W. R., Jin, Y., Affholter, K. A., and Wunderlich, B., *Macromolecules*, 26, 2187–2193 (1993)
78. Fu, Y., Busing, W. R., Jin, Y., Affholter, K. A. and Wunderlich, B., *Macromol. chem. phys.*, 195, 803–822 (1994)
79. Fu, Y., Annis, B., Boller, A., Jin, Y. and Wunderlich, B., *J. Polym. Sci.*: Part B: Polymer Physics, vol. 32, 2289–2306 (1994)
80. *ATHAS data bank*, 1993
81. Fina, L. J. and Koenig, J. L., *Macromolecules*, 17, 2572–2579 (1984)
82. Wittmann, J. C., Hodge, A. M., and Lotz, B., *j. Polymer Sci.*, 21:2495–2509 (1983)
83. Lu, F. M., and Spruiell, J. E., *J. Applied Polymer Sci.*, 49:623–631 (1993)
84. Fairley, G., and Prud'Homme, R. E., *Polymer Engineering and Sci.*, 27:1495–1503 (1987)
85. Binsbergen, F. L., Heterogeneous Nucleation in the Crystallization of Polyolefins, Part I.
86. Modern Plastics Encyclopedia/91, Mid-October 1990 Issue, Vol. 67, No. 11, pages 45–54.
87. U.S. Pat. No. 4,303,573
88. U.S. Pat. No. 4,336,343
89. U.S. Pat. No. 4,349,503
90. U.S. Pat. No. 4,351,757
91. U.S. Pat. No. 4,425,457
92. U.S. Pat. No. 4,429,067
93. U.S. Pat. No. 4,483,954
94. U.S. Pat. No. 4,486,564
95. U.S. Pat. No. 4,548,978
96. U.S. Pat. No. 4,753,975
97. Dutta, D., Fruitwala, H., Kohli, A., and Weiss, R. A., *Polymer Engineering and Science*, 30:1005–1018 (1990)
98. Legras, R., and Mercier, J. P., *Nature*, vol. 304:432–434 (1983)
99. Mercier, J. P., *Polymer Engineering and Science*, vol 30:270–278 (1990)

What is claimed is:

1. A shrink resistant meltblown or spunbond nonwoven web which comprises a polymer fiber made from a fiber forming poly(ethylene terephthalate) (PET) melt, wherein the polymer of the fiber consists of a PET, and a nucleating agent selected from the group consisting of a solid sodium benzoate and liquid crystal polyester (LCP), incorporated into the fiber.

2. The shrink resistant nonwoven web of claim 1 which is a meltblown web.

3. The shrink resistant nonwoven web of claim 1 which is a spunbond web.

4. The nonwoven web of claim 1 which is a multi-layered web comprising a combination of spunbond and meltblown layers.

5. The shrink resistant nonwoven web of claim 1 wherein the solid sodium benzoate does not melt during processing of the PET into fibers.

6. The shrink resistant nonwoven web of claim 1 wherein the temperature of processing of the melt is up to about 300° C.

7. The shrink resistant nonwoven web of claim 1 wherein the sodium benzoate is in an amount sufficient to promote crystallite formation in the fiber.

8. The shrink resistant nonwoven web of claim 1 wherein the shrink resistance is of reduced shrinkage when the nonwoven web is exposed to temperatures above the glass transition temperature of PET compared to a corresponding nonwoven web lacking the sodium benzoate.

9. The nonwoven web of claim 1 wherein the web consists of the fibers, wherein the polymer of the fibers consists of PET and a nucleating agent selected from the group consisting of solid sodium benzoate and LCP is incorporated into the fiber.

10. The nonwoven web of claim 1 wherein the nucleating agent is compounded into the fiber-forming melt.

11. The nonwoven web of claim 1 in which the nucleating agent increases the temperature of crystallization on cooling (Tcc) of the fibers of the web.

12. The nonwoven web of claim 11 in which the nucleating agent decreases the temperature of crystallization on heating ($T_{ch}$) of the fibers of the web.

13. The nonwoven web of claim 1 wherein a solid sodium benzoate nucleating agent and a second nucleating agent is incorporated into the PET fibers.

14. The nonwoven web of claim 1 wherein shrinkage of the web is less than 10% when the web is heated to a temperature of 190° C.

15. The nonwoven web of claim 1 which is a filter.

16. The nonwoven web of claim 1 wherein the shrinkage is reduced by at least 10% compared to the corresponding nonwoven web lacking the nucleating agent.

17. The nonwoven web of claim 1 wherein the fibers of the web have a diameter in the range of 20 to 60 microns.

18. The nonwoven web of claim 1 wherein the fibers of the web have a diameter in the range of 0.5 to 10 microns.

19. The nonwoven web of claim 1 wherein the concentration of sodium benzoate in the fibers is about 1%.

20. The nonwoven web of claim 1 wherein the nucleating agent is LCP.

21. A shrink resistant fiber which comprises a polymer consisting of poly(ethylene terephthalate) (PET) and a nucleating agent selected from the group consisting of a solid sodium benzoate and a liquid crystal polyester (LCP) incorporated into the fiber.

22. The fiber of claim 21 wherein the solid sodium benzoate does not melt during processing of the PET into fibers.

23. The fiber of claim 21 wherein the temperature of processing of the melt is up to about 300° C.

24. The fiber of claim 21 wherein the nucleating agent is in an amount sufficient to promote crystallite formation in the fiber.

25. The fiber of claim 21 wherein the shrink resistance is of reduced shrinkage when the nonwoven web is exposed to temperatures above the glass transition temperature of PET compared to a corresponding nonwoven web lacking the nucleating agent.

26. The fiber of claim 21 wherein the nucleating agent is compounded into the fiber-forming melt.

27. The fiber of claim 21 in which the nucleating agent increases the temperature of crystallization on cooling (Tcc) of the fiber.

28. The fiber of claim 21 in which the nucleating agent decreases the temperature of crystallization on heating ($T_{ch}$) of the fiber.

29. The fiber of claim 21 wherein a second nucleating agent is incorporated into the PET fiber.

30. The fiber of claim 21 which has a diameter in the range of 20 to 60 microns.

31. The fiber of claim 21 which has a diameter in the range of 5 to 10 microns.

32. The fiber of claim 21 wherein the concentration of sodium benzoate in the fiber is about 1%.

33. The fiber of claim 21 wherein the concentration of LCP in the fiber is about 10%.

34. The nonwoven web of claim 1 wherein an LCP nucleating agent and a second nucleating agent is incorporated into the PET fibers, wherein the second nucleating agent is an ionomer.

35. The nonwoven web of claim 13 wherein the second nucleating agent is LCP.

36. The fiber of claim 21 wherein a solid sodium benzoate nucleating agent and a second nucleating agent is incorporated into the PET fibers.

37. The fiber of claim 36 wherein the second nucleating agent is LCP.

38. The fiber of claim 21 wherein an LCP nucleating agent and a second nucleating agent is incorporated into the PET fibers, wherein the second nucleating agent is an ionomer.

* * * * *